US005634049A

United States Patent [19]
Pitkin

[11] Patent Number: 5,634,049
[45] Date of Patent: May 27, 1997

[54] METHOD AND APPARATUS FOR CONSTRUCTING A NEW DATABASE FROM OVERLAPPING DATABASES

[76] Inventor: John R. Pitkin, 18 Fayette St., Cambridge, Mass. 02139

[21] Appl. No.: 405,815

[22] Filed: Mar. 16, 1995

[51] Int. Cl.⁶ .................................................. G06F 7/00
[52] U.S. Cl. ..................... 395/613; 364/DIG. 1; 364/282.1; 364/258.4; 364/259
[58] Field of Search ................................ 395/600, 650; 364/DIG. 1

[56] References Cited

U.S. PATENT DOCUMENTS

| | | | |
|---|---|---|---|
| 4,885,684 | 12/1989 | Austin et al. | 364/300 |
| 5,257,369 | 10/1993 | Skeen et al. | 395/650 |
| 5,341,498 | 8/1994 | Connor et al. | 395/600 |
| 5,448,727 | 9/1995 | Annevelink | 395/600 |
| 5,481,703 | 1/1996 | Kato | 395/600 |

OTHER PUBLICATIONS

Learning Possibilistic Network from data (Fuzzy System, Int'l Conf 1995 vol. 3 date 00/1995) IEEE.

*Primary Examiner*—Thomas G. Black
*Assistant Examiner*—Jean M. Corrielus
*Attorney, Agent, or Firm*—Gary D. Clapp, Esq.

[57] ABSTRACT

A method and an apparatus for constructing a resultant database from a first database and a second database wherein data to appear in the resultant database is present in modified form in the first and second databases. A user selects from the first database at least one construction property to be used in constructing the resultant database wherein there is partial congruence of the at least one construction property between the first, second and resultant databases and from the first and second databases at least two modeling properties wherein there is partial congruence of the at least two modeling properties between the first, second and resultant databases. An inclusion probability processor assigns an inclusion probability, to each one of the data records of the first database containing the selected construction and modeling properties. A modeling processor constructs the modeling properties of the second database and models and compares the modeled modeling properties of the first database against the constructed modeling properties of the second database, and adjusts the inclusion probability of each of the data records of the first database in accordance with the comparison until an acceptable match is achieved between all the modeling properties of the first and second databases. A data record construction processor constructs resultant data records from the finally selected data records of the first database using the final inclusion probabilities with a probabilistic assignment.

2 Claims, 11 Drawing Sheets

| SUMMARY LEVEL AREA | SUMMARY LEVEL CODE | GEOGRAPHIC COMPONENT CODE |
|---|---|---|
| STATE | 040 | 00 40 42-44 |
| STATE-COUNTY | 050 | 00 |
| STATE-COUNTY-COUNTY SUBDIVISION | 060 | 00 |
| STATE-COUNTY-COUNTY SUBDIVISION-PLACE/REMAINDER | 070 | 00 |
| STATE-COUNTY-COUNTY SUBDIVISION-PLACE/REMAINDER-CENSUS TRACT/ BLOCK NUMBERING AREA | 080 | 00 |
| STATE-COUNTY-COUNTY SUBDIVISION-PLACE/REMAINDER-CENSUS TRACT/BLOCK NUMBERING AREA-AMERICAN INDIAN/ALASKA NATIVE AREA/REMAINDER-RESERVATION/TRUST LANDS/REMAINDER-ALASKA NATIVE REGIONAL CORPORATION/REMAINDER-URBANIZED AREA/ REMAINDER-URBAN/RURAL-CONGRESSIONAL DISTRICT-BLOCK GROUP | 090 | 00 |
| STATE-COUNTY-CENSUS TRACT/BLOCK NUMBERING AREA | 140 | 00 |
| STATE-COUNTY-CENSUS TRACT/BLOCK NUMBERING AREA-BLOCK GROUP | 150 | 00 |
| STATE-PLACE-COUNTY | 155 | 00 |
| STATE-PLACE | 160 | 00 |
| STATE-CONSOLIDATED CITY | 170 | 00 |

FIG. 1A

| SUMMARY LEVEL AREA (continued) | SUMMARY LEVEL CODE | GEOGRAPHIC COMPONENT CODE |
|---|---|---|
| STATE-AMERICAN INDIAN RESERVATION WITH TRUST LANDS | 210 | 00 |
| STATE-AMERICAN INDIAN RESERVATION WITH TRUST LANDS; RESERVATION ONLY | 211 | 00 |
| AMERICAN INDIAN RESERVATION [RESERVATION WITH OR WITHOUT TRUST LANDS; RESERVATION ONLY]/TRIBAL JURISDICTION STATISTICAL AREA/TRIBAL DESIGNATED STATISTICAL AREA/ALASKA NATIVE VILLAGE STATISTICAL AREA-STATE-COUNTY | 220 | 00 |
| STATE-AMERICAN INDIAN RESERVATION WITH TRUST LANDS; TRUST LANDS ONLY | 212 | 00 |
| AMERICAN INDIAN TRUST LANDS [TRUST LANDS WITH OR WITHOUT RESERVATION; TRUST LANDS ONLY]-STATE-COUNTY | 221 | 00 |
| STATE-AMERICAN INDIAN RESERVATION WITH NO TRUST LANDS/TRIBAL JURISDICTION STATISTICAL AREA/TRIBAL DESIGNATED STATISTICAL AREA/ALASKA NATIVE VILLAGE STATISTICAL AREA | 215 | 00 |
| AMERICAN INDIAN RESERVATION [RESERVATION WITH OR WITHOUT TRUST LANDS; RESERVATION ONLY]/TRIBAL JURISDICTION STATISTICS AREA/ TRIBAL DESIGNATED STATISTICS AREA/ALASKA NATIVE VILLAGE STATISTICAL AREA-STATE-COUNTY | 220 | 00 |

FIG. 1B

| SUMMARY LEVEL AREA (continued) | SUMMARY LEVEL CODE | GEOGRAPHIC COMPONENT CODE |
|---|---|---|
| STATE-AMERICAN INDIAN TRUST ;AMDS [TRUST LANDS WITH NO RESERVATION] | 216 | 00 |
| AMERICAN INDIAN TRUST LANDS [TRUST LANDS WITH OR WITHOUT RESERVATION; TRUST LANDS ONLY]-STATE-COUNTY | 221 | 00 |
| STATE-ALASKA NATIVE REGIONAL CORPORATION | 230 | 00 |
| STATE-METROPOLITAN STATISTICAL AREA/CONSOLIDATED METROPOLITAN STATISTICAL AREA | 319 | 00 |
| METROPOLITAN STATISTICAL AREA [NO CMSAs]-STATE-CENTRAL CITY | 340 | 00 |
| METROPOLITAN STATISTICAL AREA [NO CMSAs]-STATE-COUNTY | 329 | 00 |
| STATE-CONSOLIDATED METROPOLITAN STATISTICAL AREA-PRIMARY METROPOLITAN STATISTICAL AREA | 321 | 00 |
| CONSOLIDATED METROPOLITAN STATISTICAL AREA-PRIMARY METROPOLITAN STATISTICAL AREA-STATE-CENTRAL CITY | 341 | 00 |
| CONSOLIDATED METROPOLITAN STATISTICAL AREA-PRIMARY METROPOLITAN STATISTICAL AREA-STATE-COUNTY | 331 | 00 |
| STATE-URBANIZED AREA | 420 | 00 |
| URBANIZED AREA-STATE-CENTRAL PLACE | 450 | 00 |
| URBANIZED AREA-STATE-COUNTY | 430 | 00 |
| URBANIZED AREA-STATE-COUNTY-COUNTY SUBDIVISION | 440 | 00 |
| URBANIZED AREA-STATE-COUNTY-COUNTY SUBDIVISION-PLACE | 450 | 00 |

FIG. 1C

| TENURE | | FUEL HEAT | | YR BUILT | |
|---|---|---|---|---|---|
| TENURE | | HOUSE HEATING FUEL | | WHEN STRUCTURE FIRST BUILT | |
| 0. | N/A(GQ/VACANT) | 0. | N/A(GQ/VACANT) | 0. | N/A(GQ) |
| 1. | OWNED WITH MORTGAGE OR LOAN | 1. | GAS: UNDERGROUND PIPE | 1. | 1989 OR 1990 |
| 2. | OWNED FREE AND CLEAR | 2. | GAS: BOTTLED, TANK OR LP | 2. | 1985 TO 1988 |
| 3. | RENTED FOR CASH RENT | 3. | ELECTRICITY | 3. | 1980 TO 1984 |
| 4. | NO CASH RENT | 4. | FUEL OIL, KEROSENE, ETC. | 4. | 1970 TO 1979 |
| | | 5. | COAL OR COKE | 5. | 1960 TO 1969 |
| | | 6. | WOOD | 6. | 1950 TO 1959 |
| | | 7. | SOLAR ENERGY | 7. | 1940 TO 1949 |
| | | 8. | OTHER FUEL | 8. | 1939 NOR EARLIER |
| | | 9. | NO FUEL USED | | |

FIG. 3A     FIG. 3B     FIG. 3C

| SAMPLE NO. | TENURE | FUELHEAT | YRBUILT |
|---|---|---|---|
| H0003481 | 1 | 3 | 1 |
| H0003483 | 3 | 2 | 1 |
| H0003484 | 1 | 1 | 2 |
| H0003485 | 4 | 1 | 1 |
| H0003486 | 2 | 2 | 1 |
| H0003487 | 2 | 3 | 2 |
| H0003488 | 3 | 2 | 1 |
| H0003489 | 3 | 3 | 1 |
| H0003490 | 3 | 2 | 1 |
| H0003491 | 3 | 1 | 1 |

SET 24

DE$_s$ 30

PUMs 36

| YEAR STRUCTURE BUILT | TENURE | |
|---|---|---|
| | OWNER OCCUPIED | RENTER OCCUPIED |
| 1989 TO MARCH 1990 | 848 | 392 |
| 1985 TO 1986 | 4,808 | 1,167 |
| 1980 TO 1984 | 3,675 | 2,448 |
| 1970 TO 1979 | 11,853 | 7,375 |
| 1960 TO 1969 | 14,697 | 3,950 |
| 1950 TO 1959 | 11,938 | 2,159 |
| 1940 TO 1949 | 4,916 | 1,853 |
| 1939 OR EARLIER | 18,981 | 10,975 |

FIG. 4A

| HOUSE HEATING FUEL | |
|---|---|
| UTILITY GAS | 35,992 |
| BOTTLED, TANK OR LP GAS | 1,983 |
| ELECTRICITY | 11,126 |
| FUEL OIL, KEROSENE, ETC. | 51,085 |
| COAL OR COKE | 435 |
| WOOD | 1,062 |
| SOLAR ENERGY | 25 |
| OTHER FUEL | 199 |
| NO FUEL USED | 116 |

FIG. 4B

METHOD AND APPARATUS FOR CONSTRUCTING A NEW DATABASE FROM OVERLAPPING DATABASES

FIELD OF THE INVENTION

The present invention relates to a method for constructing a database and, in particular, to a method for constructing a new database from two or more previously existing databases of different but overlapping models.

BACKGROUND OF THE INVENTION

A recurring problem in the construction and use of databases and the data stored therein is that the data from which a database is to be constructed is often not available in the necessary or desired form. For example, the data may not be available in its original form, but only in one or more processed forms in other databases. These other databases, in turn, may have been created to a different model than that of the intended database, that is, to a different set of criteria or for different purposes. The available databases may thereby contain data or represent data relationships in forms that is different from both the original forms of the data or data relationships and from the forms desired or necessary for the new database.

To illustrate, microdata records are machine readable data files issued by a public or governmental agency, such as the U.S. Census Bureau, and contain records representing information gathered and processed by the agency. The original data from the U.S. Census is not available to the public, but databases constructed from the census data are publicly available in various forms. An example of such are the 1% and 5% Public Use Microdata Records (PUMSs) issued by the U.S. Census Bureau for the 1980 Census and the 1990 Census. Another source of census information is the Summary Tape File (STF) tabulations of census long-form population, household and housing characteristics for census tracts, block groups and other census defined areas.

PUMSs and STF tabulations are both created from the original census master file data records, each of which contains detailed individual data for each census subject and identifies each subject by name and residence, that is, by address or housing unit. PUMSs and STF tabulations, however, are each constructed on models, that is, according to sets of criteria, which represent properties which are different from both the original data records and from each other, wherein the properties of a database may be defined as comprised of the types or classes of information represented by the values stored in the databases. As such, PUMSs and STF tabulations are constructed in a manner which modifies or destroys certain of the properties of the data elements of the original data records or the relationships between the data elements of the original data records, or both.

For example, while PUMSs are subsets of records in Census master files, not all data entities, such as exact location of housing unit and type of group quarters are recorded in PUMS records and some PUMS data entities are recoded from multiple fields of the Census master files or from one or more records in a household. In addition, and in order to protect the privacy of census respondents, however, all personal identification information, such as names and addresses are deleted from PUMSs, and extreme incomes and house values are recoded to a uniform topcode.

Further, all of the data records in a set of data records comprising a PUMS are drawn from the same geographic area, but the location and extents of each such geographic area, referred to as a Public Use Microdata Area (PUMA), are determined by the area necessary to meet a minimum size requirement for the population from which the set is drawn. To protect respondent's privacy, PUMAs are constructed to that they contain a population of no less than 100,000 persons. Therefore, while the sets are delineated on a per state basis and, when possible, on a per county basis, the primary criterion for delineating a PUMA and constructing a set of data records for a PUMS for the PUMA is the size of the population from which the set is drawn, and any correlation between the geographic delineation of a PUMA and any geographic area of analytic interest is a secondary consideration.

The data records in a given PUMS database may therefore be identified as regards state and, in many instances, a single set of large subdivisions within a state, and having a population of over 100,000. A given PUMS therefore contains data records identifiable to a large county, a part of a large county or multiple counties, and will often merge data records from demographically disparate areas, such as two distinct neighborhoods or areas of a city or a part of a city and an adjacent suburban or rural area.

Therefore, while the data records contained in a PUMS are a statistically accurate representation of the original data for the PUMA, and include or reflect all of the original census data records in the PUMA, the data records have been divorced from any general relationship with defined geographic areas of social, economic, political or commercial significance and comprised of specific counties, cities, towns or neighborhoods.

Further, and as mentioned above, the data records included in a PUMS do not include a data record for each person, housing unit or household in a PUMA, but contain representative samples of the persons, housing units or households in the PUMA. In order to expand the data records to represent the total population and number of households and housing units in a PUMA, it is therefore necessary to apply a statistical weight, equal to the inverse of the sampling ratio, to each data record. These weights may vary across persons, households and housing units. In this case, the data records are further processed by the encoding of the statistical weight in each individual data record. In other cases, the uniform weight is a characteristic of the data set. The data records are therefore further processed by encoding a statistical weight, the inverse of the sampling ratio, in each individual data record. The weights can then be used to expand the data records to represent the total population and number of persons, housing units and households in the PUMA.

An STF tabulation contains one or more sets of data records wherein each set of data records is compiled from the original census data records for a standard, systematic hierarchy of census geographic areas. This standard hierarchy includes the following classes of areas: block, within block group (or part), within census tract or block numbering area (or part), within place (or part), within county subdivision, within county, within State, within division within region, within the United States. In addition, and independently of this standard hierarchy of areas, STF tabulations are produced for entities which may be split in a hierarchical presentation, such as place, census tract/block numbering area or block group. For example, FIGS. 1A, B and C shows the Summary Level Area Sequence Chart for STF 3A in the U.S. Census of 1990. Therefore the STF data can be selected and identified for all of these socially, economically or politically significant areas. Data records in an STF tabulation contain data elements which represent the distribution of the values of one or more elements of the household, person or housing unit records represented in the tabulation of an STF area. These distributions may be one-way distributions, that is, simple statistical frequencies, or two or more way distributions, that is, cross tabulations, and may be based upon single data entities or composites, that is, recodings, of multiple data entries. Some aggregates, or sums, and median values are also reported in STF tabulations, but these are an exception.

In an STF tabulation, therefore, the data records in an STF tabulation all belong to elements in one or more hierarchies of geographic areas, such as counties, towns, cities, minor civil divisions, neighborhoods and subdivisions thereof, rather than to geographic areas arbitrarily defined to exceed a minimum population size. The geographic properties of the STF data records, that is, the relationships between the data records and defined areas of social, economic, political or commercial significance, is thereby retained in STF tabulations. The individual, detailed properties of the persons, housing units or households in any geographic area of an STF tabulation, however, are submerged in the aggregates of these properties, thereby destroying the properties of and the relationships within and between the individual data records but protecting the confidentiality of individual responses by combining the responses of many households or persons into the aggregates.

Further, the STF records for different areas can be combined to obtain aggregated tabulations for defined areas comprised of counties, towns, cities, minor civil divisions, places, Census tracts, block groups or combinations of such STF reporting areas. These records can be aggregated because almost all of their elements are additive, that is, the distribution of the values for a variable characteristic field for area C, which is comprised of STF reporting areas A and B, is the sum of the separate distributions of the values of the field for areas A and B, or of the aggregates of such properties as total income, house value, and so on, with the exception medians, which are not additive. Therefore, STF tabulation data can in general be derived for any and all larger areas which can be defined as aggregates of STF reporting areas. Such areas may be general economic, social or political significance or of significance for a particular commercial, organizational or analytic purpose, such as a service area or market territory or trading area, analytic zone or PUMA.

Therefore, and in illustration of the general problem, while it is frequently useful and desirable to have a database representing detailed information on individual persons, housing units and households in user definable geographic areas of social, economic, political or commercial significance, this information is not accessible from either PUMSs or STF tabulations. That is, the original census data records are not publicly available for such purposes and, while PUMSs retain the detailed data elements and properties of the original, individual data records, the relationship between the data records and the geographic areas of interest is lost. STF tabulations, in turn, preserve the relationships between the data records and user definable geographic areas of interest, but the properties of the individual data records are lost.

To illustrate various approaches of the prior art to this general problem, using the example discussed above, a number of ad hoc methods have been employed to allow use of PUMS data for particular territories which cross PUMA boundaries.

For example, one approach approximates a particular territory with data for the set of PUMAs which best matches the territory boundaries. This approach can give accurate results when the match between the territory and the PUMAs is close, but does not provide a general solution to the problem because of the large minimum size of PUMAs.

Another approach approximates a particular territory with data for the set of PUMAs which best matches the territory boundaries and ratio adjusts either tabulated frequencies or tabulated weighted frequencies by the ratio of the territory population to total PUMA population, which is known from STF tabulations. This adjustment to the data corrects for gross differences in the population size of the PUMA set and that of the particular territory, but not for systematic differences, that is, non-homogenieties, between the household, housing or population characteristics of the territory and non-territory portions of the PUMA set, that is, the portions of the PUMA set which are respectively included and not included in the territory.

Yet another approach approximates the particular territory with data for the set of PUMAs which best matches the territory boundaries and adjusts tabulated frequencies or joint distributions by marginal or joint frequency distributions for the territory as obtained from STF tabulations. This adjustment corrects for systematic differences between the household, housing or population characteristics of the territory and non-territory portions of the PUMAs insofar as these characteristics are reported in STF tabulations. Not all characteristics are reported, however, and those that are reported are only reported in a particular format which may not conform to the desired tabulation. This approach therefore requires a high degree of analytic skill, sophisticated data processing and labor and is not effective for tabulations of user-specific recodes of variables or for other multivariate statistical procedures.

Still another approach of the prior art is to create a territory subset from the PUMS by randomly drawing, for each partially included PUMA, a subsample of the correct size as determined by population. This approach relaxes the constraints noted for the previous approach but leads to biases due to systematic differences, that is, non-homogeneities, between the household, housing or population characteristics of the territory and non-territory portions of the PUMAs.

The present invention provides a solution to these and other related problems of the prior art.

SUMMARY OF THE INVENTION

The present invention is directed to a method and an apparatus for use in a data processing system for constructing a resultant database from a first database and a second database wherein data to appear in the resultant database is present in modified form in the first and second databases. The data processing system includes a memory for storing the first, second and resulting databases, a processor for performing operations upon data records of the first, second and resulting databases and a plurality of procedures for controlling the operations of the processor.

According to the present invention, a user selects from the first database at least one construction property to be used in constructing the resultant database wherein a construction property is a type of information represented in partically or in wholly implicit form by values stored in the data records of the first database and in explicit form by values stored in the second database and wherein there is partial congruence of the at least one construction property between the first, second and resultant databases. The user also selects from the first and second databases at least two modeling properties wherein a modeling property is a type of information represented in partially or in wholly implicit form by values stored in the data records of the first database and in explicit form by values stored in the second database and wherein there is partial congruence of the at least two modeling properties between the first, second and resultant databases.

An inclusion probability processor the executes an inclusion probability procedure and assigns an inclusion probability to each one of the data records of the first database containing the selected construction and modeling properties.

A modeling processor then executes a modeling procedure, constructs the modeling properties of the second database and models the modeling properties the data records of the first database containing the modeled modeling properties against the constructed modeling properties of the data records of the second database containing the selected modeling properties. The modeling processor compares the modeled modeling properties of the data records of the first data base and the constructed modeling properties of the second database and adjusts the inclusion probability of each one of the data records of the first database containing the selected modeling properties in accordance with the comparison of the modeled modeling properties of the data records of the first database and the constructed modeling properties of the data records of the second database until an acceptable match is achieved between all the modeling properties of the data records of the first and second databases.

A data record construction processor then executes a data record construction procedure and constructs data records of the resultant database from the finally selected data records of the first database using a probabilistic assignment operation in accordance with the final inclusion probabilities assigned to the plurality of data records of the first database to select the data records of the first database to be used in construction of the resultant database.

Other features, objects and advantages of the present invention will be understood by those of ordinary skill in the art after reading the following descriptions of a present implementation of the present invention, and after examining the drawings, wherein:

BRIEF DESCRIPTION OF THE DRAWINGS

FIGS. 1A, 1B and 1C together comprise a FIG. 1 and are a representation of the census geographic areas which comprise a PUMA;

FIGS. 3A, 3B, 3C and 3D together comprise a FIG. 3 and are an illustration of an FSDB 14 comprised of a PUMS 36;

FIGS. 4A and 4B together comprise a FIG. 4 and are an illustration of an SSDB 16 comprised of an STFT 40;

DESCRIPTION OF THE INVENTION

Figure 2:
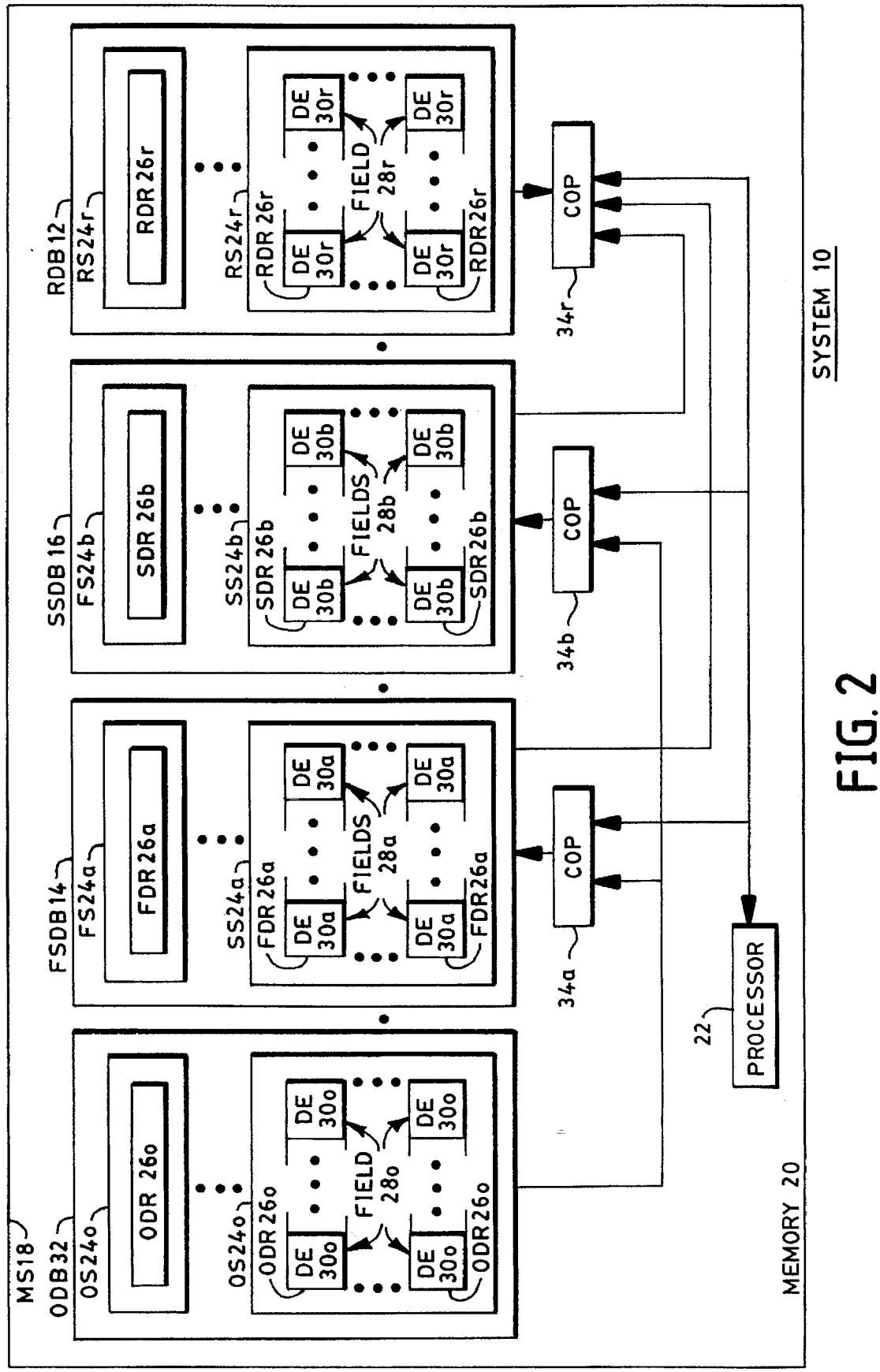
FIG. 2 is a diagrammatic representation of a system incorporating the present invention and the data structures and mechanisms of the present invention.

Referring to FIG. 2, therein is shown a diagrammatic representation of a Data Processing System (System) 10 for executing the method of the present invention for constructing a Resultant Database (RDB) 12 from a First Source Database (FSDB) 14 and a Second Source Database (SSDB) 16. As represented therein, System 10 includes a Mass Storage (MS) 18 for storing RDB 12, FSDB 14 and SSDB 16, a Memory 20 for storing at least selected data elements from RDB 12, FSDB 14 and SSDB 16, and a Processor 22 for performing operations upon the data elements of RDB 12, FSDB 14 and SSDB 16 residing in Memory 20.

A. General Discussion of Source and Resultant Databases (FIG. 2)

As shown in FIG. 2, FSDB 14 and SSDB 16 are each constructed from a body of original data, represented generally in FIG. 2 as Original Database (ODB) 32, which in turn is comprised of one or more Original Sets (OSs) 24o of Original Database Records (DRs) 26o wherein each DR 26o contains one or more Fields 28o and each Field 28o contains a Data Element (DE) 30o comprising a value representing a property of the census reporting entity referred to by a DR 26o. For the purposes of the following discussions, a census reporting entity is an individual person, facility or organization or a grouping of persons, facilities and/or organizations for which information may be separately reported by a single respondent. Where grouped, the relationships among the sub-entities (persons, facilities or organizations) in a reporting entity are generally held to be of significance and are maintained in internal census databases and hence the ODB 32. In a U.S. population census there are three classes of reporting entities: (1) occupied housing units—household-household person(s), (2) vacant housing unit and (3) group quarters person. An economic census may also include firm-establishment as a type of reporting entity. In this example, ODB 32 would be comprised of the edited original census responses and the characteristics and properties represented in the DEs 30o would include all of the data items obtained in the census, i.e., on the census form, including personal identification information, such as names and addresses. It will be noted that each OS 24o of DRs 26o refers to a corresponding population set, which is defined for the purposes herein as a set of census reporting entities.

Further, FSDB 14 and SSDB 16 are each comprised of one or more Sets 24 of Data Records (DRs) 26, illustratively represented as First Sets (FSs) 24a and Second Sets (SSs) 24b and First Data Records (FDRs) 26a and Second Data Records (SDRs) 26b wherein Sets 24 may potentially include up to $N^{th}$ Sets (NSs) 24n and DRs 26 may potentially include up to $N^{th}$ Data Records (NDRs) 26n and wherein, again, each DR 26 refers to a census entity or a set of census entities. Each of DRs 26 is in turn comprised of one or more Data Fields (Fields) 28, illustratively represented as Fields 28a and 28b, each containing a Data Element (DE) 30, illustratively represented as DEs 30a and 30b, wherein each DE 30 comprises a value representing a property of the corresponding DR 26. For purposes of the following discussions, a property of a database is defined as a type or class of information represented by the values stored in the database, that is, in at least some of the data elements of the database, and a characteristic of a database is defined as the range of values occurring for a property in a database.

For example, as discussed above an FSDB 14 may be comprised of a PUMS containing a FS 24a of FDRs 26a wherein each FDR 26a represents a given person, housing unit or household of a PUMA. The FSDB 14 would therefore have a geographic identification property and a corresponding DE 30 pertaining to the location and extents of the PUMA and the characteristic of the geographic identification property would be codes identifying the specific PUMAs, the location and extents of which are specified in the documentation of the FSDB 14. The FSDB 14 would have other properties, such as age, income, education and so forth, wherein the ranges of values appearing in the DEs 30a containing these properties would be the characteristics of these properties and the database. A SSDB 16 could then comprise an STF tape containing one or more SSs 24b wherein each SS 24b is an STF tabulation for a particular geographic area. Each SS 24b would have a geographic identification property and corresponding DE 30b pertaining to the location and extents of a census area wherein the characteristic of this property for a given SS 24b would be the identification of the specific census area. The SSs 24b would have other properties pertaining to age, income, educations, and so forth, and the characteristics of these properties stored in the DEs 30b of each SDR 26b would be the values representing the aggregates of these properties across the geographic areas represented by SSs 24b.

RDB 12 likewise contains one or more Resultant Sets (RSs) 24r of Resultant Data Records (RDRs) 26r wherein each RDR 26r is comprised of one or more Fields 28r and each Field 28r contains a DE 30r comprising a value representing a property of a census reporting entity corresponding to a RDR 26r in the RDB 12. With the exception of the geographic identification property, the properties and associated characteristics of FSDB 14 and RDB 12 are equivalent in the present example.

As indicated in FIG. 2, FSDB 14 and SSDB 16 are constructed from ODB 32 by operations performed upon the data elements of ODB 32, as represented respectively and generally in FIG. 2 by Construction Operations (COPs) 34a and 34b, while RDB 12 is constructed from FSDB 14 and SSDB 16 by operations performed on the data elements of FSDB 14 and SSDB 16 and represented by COPs 34r. COPs 34r are the subject matter of the present invention and examples of COPs 34a and 34b will be apparent from the previous discussions of PUMSs and STF tabulations. For example, a PUMS FSDB 14 is constructed from ODB 32 by randomly selecting from ODB 32 a sufficient number of ODRs 26o to meet the arbitrary set size determined for the sample, wherein the ODRs 26o are selected from a PUMA of sufficient size, and deleting the DEs 30o containing respondent identification information or other information which might be sufficient to infer such a respondent's identity. Each SS 24b of an STF tabulation is constructed by enumerating the values of specified properties of the entities represented by ODRs 26o and located within one of the geographic areas in the systematic hierarchy of such areas defined for the STF tabulation. The tabulation set, or universe, may be a subset of the census reporting entities or of the census reporting sub-entities in the area. It must be noted that, for the purposes of the present invention, it is assumed that ODB 32 has been previously operated upon by COPs 34a and 34b to construct FSDB 14 and SSDB 16 and that while the nature of COPs 34 and probably the specific steps performed by COPs 34 are known, ODB 32 is not accessible for purposes of constructing RDB 12.

Lastly, it will be understood by those of ordinary skill in the art that the data structures represented by RDB 12, FSDB 14, SSDB 16 and ODB 32 may vary in many respects from the above descriptions while still adhering to the principles and methods of the present invention. For example, data elements which have a common value over an entire database or even over a significant member of data records within a database, such as a geographic area identification, may not appear as an individual data element in a field of each data record but instead may reside in a header or documentation associated with the database as a whole or in a header or documentation associated with a part of the database.

B. Relationships Between Database Elements (FIG. 2)

Next considering the relationships between the data elements appearing in ODB 32, FSDB 14, SSDB 16 and RDB 12, it will be noted that the data records residing in an FSDB 14 or a SSDB 16 may comprise an equivalent set or a subset or superset of the data records contained in ODB 32 and the data elements in any FSDB 14 or SSDB 16 set, subset or superset of the ODB 32 data records may be direct or derivative data elements.

That is, the FSDB 14 or SSDB 16 data records will be subsets of ODB 32 if selected from a defined group of the ODB 32 data records and will be supersets if the information selected from ODB 32 is used to generate new types or classes of data records and associated data elements for FSDB 14 or SSDB 16. The data elements will be "direct" if selected or copied directly from the ODB 32 to the FSDB 14 or SSDB 16 and will be "modified" if the information contained in the ODB 32 data elements is derived, processed or otherwise used to generate a new FSDB 14 or SSDB 16 property or characteristic in the FSDB 14 or SSDB 16.

Again using the example of PUMSs and STF tabulations, ODB 32, comprising the original, complete compilation of census data, will contain all data records obtained for a census. These records correspond to all of the census reporting entities in the population set and will include all data elements obtained in the census. As such, a PUMS FSDB 14 or a STF tabulation SSDB 16 generally each represent subsets of the census reporting entities in the population set of ODB 32; that is, the FSDB 14 and the SSDB 16 each contain data records corresponding to a subset of the population set of ODB 32. As described, the FSDB 14 data records are randomly selected from ODB 32 data records for census reporting entities in a PUMA on the basis of the sampling ratio for a PUMS in a PUMA and the SSDB 16 data records are selected according to the census area in which the census reporting entity is represented by the records resides or is situated.

The population set of the data records contained in a PUMS FSDB 14 may be generally classified as a subset from the population set of ODB 32 and the data records as a modified subset of the data records from ODB 32. That is, and with the exception of the personal identification information such as name and address and rare and potentially unique characteristics, which are deleted from the FSDB 14 data records and any recoded elements, the FSDB 14 data elements are direct copies of the data elements from corresponding data records of ODB 32. It should be noted with respect to the geographical location information and certain recoded elements contained in FSDB 14 data records, however, that these data elements comprise a modified subset of the corresponding data elements in the corresponding ODB 32 data records. That is, the characteristics represented by the personal location data elements in each of the ODB 32 data records are not directly copied into the corresponding FSDB 14 data records, but appear in modified form as a characteristic representing a code which identifies a PUMA represented in the PUMS and the recoded elements are not directly copied into the corresponding FSDB 14 data records, but are synthesized based upon the characteristics of multiple data elements of the data record for a single census reporting entity.

Each STF tabulation represents a subset of the ODB 32 data records by representing data of those census reporting entities residing or located in a certain census area. Likewise, the population set of each STF tabulation represents a subset of the population set of ODB 32, which subset is comprised of the census reporting entities residing or located in a certain census geographic area or a specified subset of this subset. The geographic location information in the STF tabulation is again a modified subset of the corresponding personal location information from the corresponding ODB 32 data records; the characteristics representing personal name and address information are replaced by a characteristic representing an identification of the defined area of the STF tabulation. Finally, the remaining data elements in the STF tabulation are also a superset of the aforementioned ODB 32 data records because the characteristics appearing in STF tabulation data elements represent enumerations, medians, or aggregates of the values of the corresponding ODB 32 data elements rather than their original values.

Next considering RDB 12, it is the purpose of the present invention to construct a new database, that is, an RDB 12, from the available databases, that is, from FSDB 14 and SSDB 16, wherein the RDB 12 represents properties which are different from those of the FSDB 14 and the SSDB 16 and wherein the properties of FSDB 14 and SSDB 16 differ from one another.

In illustration, and as discussed, the geographic characteristics of a PUMS and an STF tabulation differ from those of the original census data records in that the census reporting entity's location information is replaced by modified geographical area information and the geographic characteristics of PUMSs in general differ from those of STF tabulations in that one represents a geographic area determined by a population size requirement while the other represents a census area defined in the systematic hierarchy of census areas or other functional areas which can be combined flexibly to match closely if not exactly a wide variety of areas of social, economic, political, commercial or analytic significance. Further, the model for STF tabulations differs from both the original census records and the PUMS records in that the characteristics of the STF tabulations represent aggregate distributions of the detailed information in the original census records and, within the limits of sampling variability, the PUMS records. The characteristics of the model for an RDB 12 of the present example differ specifically from these databases by containing detailed information regarding each of a sample of census reporting entities residing or located in a particular geographic area of social, economic, political, commercial or analytic interest.

As will be described in detail below, the present invention accomplishes this purpose by constructing a number of properties and their characteristics of an RDB 12, that is, groups of DEs 30r representing the property of the RDB 12 and containing values representing the characteristic of those properties, from the information stored in DEs 30 of a FSDB 14, using the information stored in those or other DEs 30 of FSDB 14 and information stored in DEs 30 of the SSDB 16 to construct a confirmation model for the construction of the RDB 12 properties and their characteristics. It will be understood that the construction of the new DEs 30r will also involve the construction of DRs 26r and that both the DEs 30r and the DRs 26r will be direct subsets of the DRs 26 of FSDB 14, in the manner discussed above.

C. Illustrative Example (FIGS. 3, 4, 5A and 5B)

The above discussed database structures and relationships between the data elements and properties of the databases may be further illustrated by means of a specific example, such as that shown in FIG. 3 and 4.

FIG. 3 illustrates a portion of an FSDB 14 comprised of an exemplary PUMS 36 having a Set 24 wherein each DR 26 of the Set 24 corresponds to a household or housing unit and includes DEs 30 for three household/housing unit properties, Tenure, Heating Fuel and Year Built, and a DE 30 containing an identifier code which has been substituted for the personal identification information, that is, names and addresses, of the original Census records. It will be noted that the exemplary PUMS 36 includes one or more associated Data Dictionaries (DDs) 38 defining the meanings of the Tenure, Heating Fuel and Year Built codes appearing in the DEs 30, and that the PUMS 36 data can be readily cross-tabulated by tenure, heating fuel and year built, thereby providing further useful information about the relationships between the properties contained in the PUMS 36.

FIG. 4 in turn illustrates portions of an SSDB 16 comprised of an exemplary STF Tabulation (STFT) 40 for an STF Tabulation Area (STFA) and having a Set 24 consisting of a single record, wherein each Set 24 consists of a number of subsets referred to as STF Tables, which correspond to one or more properties of the census reporting entities in the area, such as Tenure and/or Heating Fuel. Each DE 30 of an STF Table subset of Set 24 contains the enumerated counts or aggregated properties of those census reporting entities which are represented in the tabulation and which satisfy specified indexing criteria. In the Tenure by Year Built table, the elements (table cells) represent the numbers of occupied housing units indexed by the year or period of years when the structure was built and tenure (owner-occupied/renter-occupied). In the House Heating Fuel table subset, the elements represent the numbers of occupied housing units in the tabulation area that use the identified types of heating fuel. It should be noted that the table subsets may not, for example, include a tabulation of Year Structure Built by House Heating Fuel.

Figure 5A:
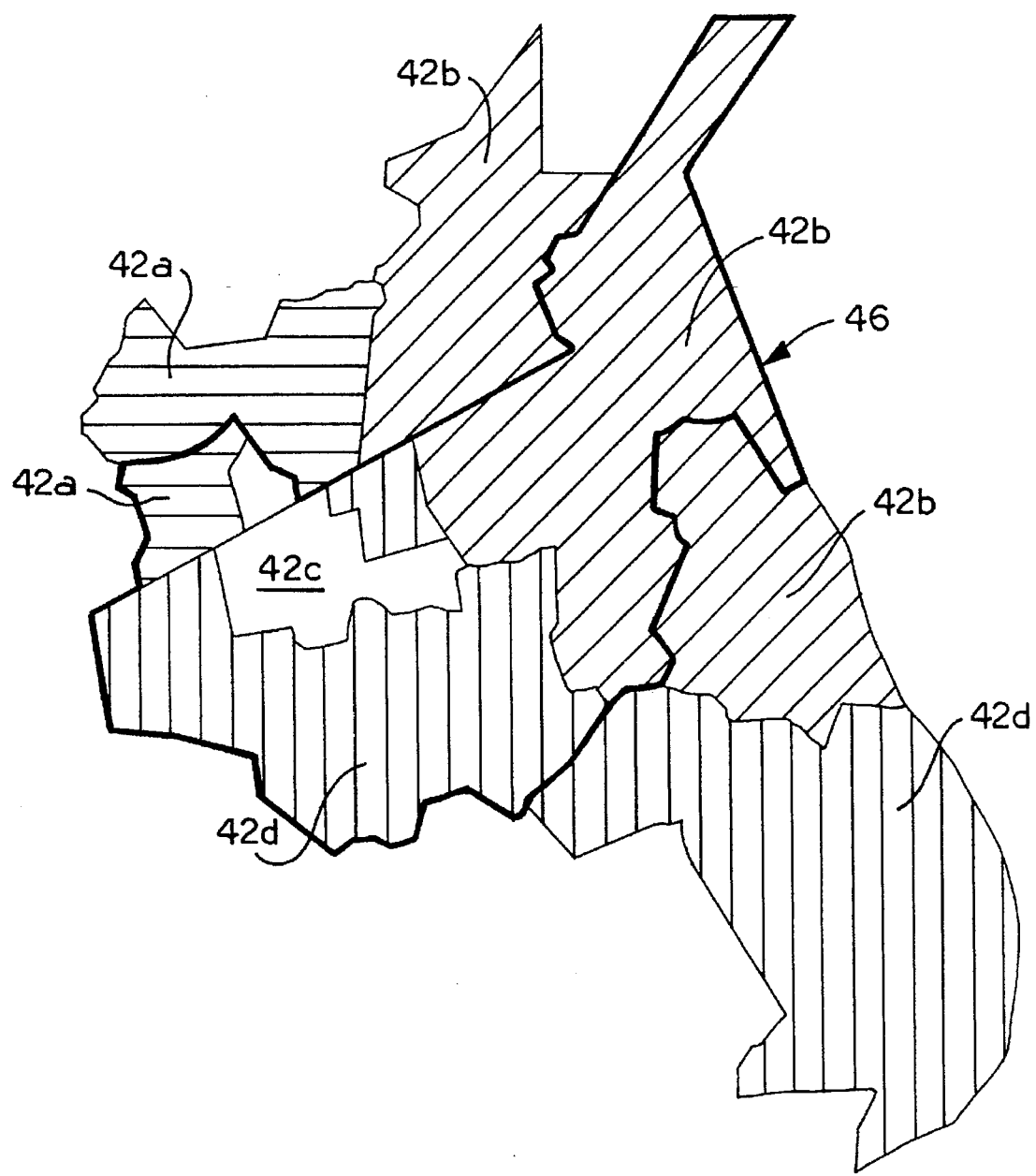
FIGS. 5A and 5B are illustrations of geographic areas comprising PUMAs 42, STFAs 44 and a RDBA 46; and, FIGS. 6A and 6B together comprise a FIG. 6 and are a diagrammatic representation of the method steps, data structures and mechanisms of the present invention.
Figure 5B:
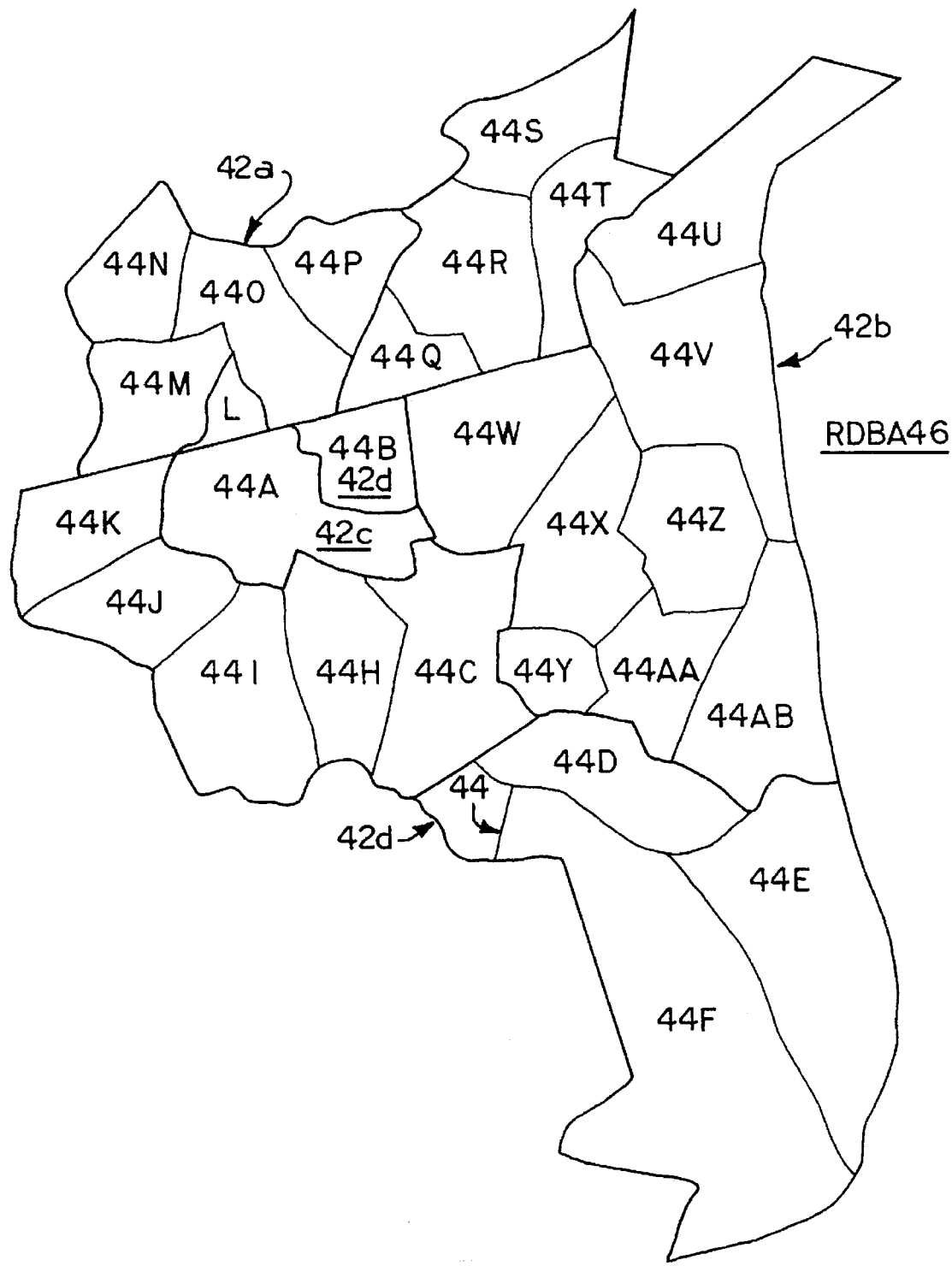

FIGS. 5A and 5B, in turn, are illustrations of geographic relationships between a group of PUMAs 42, a group of STF Reporting Areas (STFAs) 44 contained within and equivalent to the PUMAs, and a Result Database Area (RDBA) 46 of an exemplary RDB 12. The RDB 12 and RDBA 46 may represent, for example, the service area of a public or private utility with a franchise and distribution system and is geographically defined by a subset of STFAs 44 and is to contain other properties derived from the PUMSs 36 of the PUMAs 42.

As represented in FIGS. 5A and 5B, an area of geographic interest RDBA 46 is included in and covered by 4 PUMAs 42, respectively designated as PUMAs 42a, 42b, 42c and 42d, with corresponding PUMSs 36a through 36d. Specifically, RDBA 46 is comprised of STFAs 44A, 44B, . . . , and 44Y, thereby including a portion of each of PUMAs 42a through 42d. Further, there is an exact correspondence between the PUMAs 42a and sets of STFAs 44 and hence between the population sets of the PUMAs 42 and the sets of STFAs 44. PUMA 42a is comprised of STFAs 44M through 44P, PUMA 42b of STFAs 44S through 44AB, PUMA 42c of STFA 44A and PUMA 42d of STFAs 44B through 44L. Hence, in addition to the STFAs 44 which comprise the geographic area of interest RDBA 46, PUMAs 36a, 36b and 36d also contain non-RDBA 46 areas respectively comprised of STFAs 44N through 44P, STFAs 44S, 44T, 44Z, 44AA and 44AB, and STFAs 44D through 44G.

The object of the RDB 12 to be constructed from STFT's 40A through 40AB and PUMSs 36a through 36d is to represent the properties of individual households and housing units in the manner represented in PUMSs 36a through 36d, but for the area represented by RDBA 46.

As described above, the present invention accomplishes this object by selecting DRs 26 from one of the PUMSs 36 and modeling the properties contained in those DRs 26 against the corresponding properties recorded in the STFTs 40 which correspond to the RDBA-included STFAs 44 until an acceptable match is achieved between the selected and modeled properties from the PUMSs 36 and the corresponding properties of these STFTs 40. The selected DRs 26 of the PUMSs 36 are then recorded as DRs 26 of the RDB 12 as representing those and the other properties of the RDB 12 for the geographic area defined by the corresponding STFTs 40.

For example, the portion of PUMA 42d contained within the RDBA 46 is also entirely contained within STFAs 44B, 44C, 44H, 44I, 44J, 44K and 44L and the present invention will select and model the properties of DRs 26 from PUMS 36d against the corresponding properties recorded in the DRs 26 of STFTs 40B, 40C, 40H, 40I, 40J, 40K and 40L. As has been described above in the present example, the properties recorded in STFTs 40 are the aggregates of the properties recorded the PUMSs 36. The modeling of properties is accomplished in this example by first aggregating the corresponding properties of STFTs 40B, 40C, 40H, 40I, 40J, 40K and 40L to obtain the aggregates of these properties across the geographic area in common between PUMA 42d and STFTs 40B, 40C, 40H, 40I, 40J, 40K and 40L. DRs 26 of PUMS 36d are then reiteratively modeled, and their properties aggregated and compared to the aggregated properties of STFTs 40B, 40C, 40H, 40I, 40J, 40K and 40L until an acceptable match is achieved. The properties of the selected DRs 26 of PUMS 36d are then recorded as DRs 26 of the RDB 12 as representing the all properties of the RDB 12 over that portion of RDBA 46 comprised of STFAs 44B, 44C, 44H, 44I, 44J, 44K and 44L.

These steps are then repeated for PUMS 36a and corresponding STFT 40M to obtain the DRs 26 of the RDB 12 for the portion of RDBA 46 comprised of STFA 44M, for PUMS 36b and corresponding STFTs 40U, 40V, 40W, 40X and 40Y to obtain the DRs 26 of the RDB 12 for the RDBA 46 area comprised of STFAs 44U, 44V, 44W, 44X and 44Y, and for PUMS 36c and corresponding STFT 40A to obtain the DRs 26 of the RDB 12 for the RDBA 46 area comprised of STFA 44A.

D. Relationships Between Database Properties

As will be apparent from the following discussion, the present invention requires certain relationships between the properties of FSDB 14, SSDB 16 and RDB 12. First, according to the present invention, it is necessary that FSDB 14 and RDB 12 be microdata sets, in which the records represent the properties of single population entities, and that SSDB 16 be a tabulation data set, in which the records represent frequency distributions of properties of the populations entities.

More specifically, and according to the present invention, it is necessary that there be at least two sets of properties which are partially congruent among RDB 12, FSDB 14 and SSDB 16. Further purposes of the present invention, a property will be considered as partially congruent with another property when the data records containing one property are a direct or derived subset or superset of the data records containing the other property and wherein the characteristics of the properties overlap, that is, wherein the values representing those properties in the data records of one database either correspond directly to or can be derived from the values representing the properties in the data records of the other database. If, and only if, there is some subset of the tabulation sets, or areas, of an SSDB 16 which matches each reporting set, or area, in a microdata data base, FSDB 14, and if, and only if, some of the characteristics and reporting levels in the microdata base match the characteristics and levels tabulated in the summary data base, then the two data bases are partially congruent. In other words, there must be congruence of three or more properties between an FSDB 14 and an SSDB 16. Further, for reasons which will become apparent, it is necessary for purposes of the present invention that there also be partial congruence between the RDB 12 and a subset of SSDB 16 which subset is partially congruent with FSDB 14.

For example, in the census databases described herein information related to geographic location appears in both the PUMSs and the STF tabulations and in the resultant database to be constructed from the PUMSs and STF tabulations, but in different forms. As described and as illustrated in the above example, the geographic information property in a PUMS has the characteristics of identifying the location and extents of the PUMA containing the population set, from whose data records the PUMS is randomly selected, while the geographic information property in a STF tabulation has the characteristics of identifying a census tract, block group, county, city or town or portion thereof containing the population set whose characteristics are summarized in a particular STF tabulation. The congruence properties required by the present invention will be satisfied if the geographic information property of a subset of the STF tabulations is congruent with the geographic information property of the PUMSs and if the geographic information property of the RDB is congruent with the same subset of STF tabulations, that is, if the PUMAs are exactly matched by a subset of the STF areas and if different subsets of the same STF areas exactly match RDB areas. In other words, all of the STF areas from which RDB areas are to be constructed must fall within the PUMA of a PUMS.

This is clearly illustrated in the above example shown in FIGS. 3, 4 and 5 wherein a portion of RDBA 46 is contained within PUMA 42d and comprises STFAs 44B, 44C, 44H, 44I, 44J, 44K and 44L, another portion of RDBA 46 is contained within PUMA 42a and comprises STFA 44M, another portion of RDBA 46 is contained within PUMA 42b and comprises STFAs 44U, 44V, 44W, 44X and 44Y, and a last portion of RDBA 46 is contained within PUMA 42c and comprises STFA 44A. The geographic properties of PUMSs 36, STFTs 40 and the RDB 12 thereby form one of the sets of congruent properties with the geographic properties of STFTs 40 appearing in the RDB 12.

Further in this example, tenure and heating fuel form two more sets of overlapping properties, with the tenure and heating fuel properties of the STFTs 40 being a derived subset of the tenure and heating fuel properties of the PUMSs 36 and with the tenure and heating fuel properties of the PUMSs 36 appearing in the RDB 12.

It follows from the foregoing that the RDB 12 will be partially congruent with the FSDB 14, since the data records of the former will be a direct subset, or extract, of the data records of the latter, but before the execution and operation of the process of the invention described herein this congruence is merely implicit in the originally available data from which the RDB 12 is constructed by the present invention since the geographic information necessary to identify the match has been destroyed in the FSDB 14.

Further, it will be noted that the foregoing relationships between database properties do not require that any of the databases represent the characteristics of all of the population of entities in any population set. In the above example, SSDB 16 may represent the properties of entities in different samples census population sets and FSDB 14 and, by extension, RDB 12 may in turn represent samples of the sample population sets.

Finally, it will be noted that the frequency distributions of the properties represented in the SSDB 16 data set tabulations may be (1) one-way distributions of single characteristics of population entities in the population sets (or subsets thereof), (2)joint distributions of several characteristics of the population entities, or (3) distributions of compound characteristics summarizing one or more simple characteristics. Illustrative examples of (1) would be a tabulation of Fuel Used for Heating for all occupied housing units, by the categories "Piped Gas", "Bottled Gas", "Electricity", "Fuel Oil", and so on, where the categories correspond exactly to response items in the ODB 32 and a tabulation of Annual Wage and Salary Income for persons age 14 and over, by the categories "None", "Less than $5000", "$5000 to $9999", "10000 to 14999", . . . , "$90000 to $94999", "95000 to $99999", and "$100000 or more", where the corresponding response item in ODB 32 is an exact dollar income for each person; an example of (2) would be a tabulation of Race of Householder by Hispanic Origin of Householder for all households, for the Race categories "White", "Black", "American Indian, Eskimo", "Asian or Pacific Islander" and "Other" and the Hispanic Origin categories "Hispanic" and "Not Hispanic"; and an example of (3) would be a tabulation of Household Language and Linguistic Isolation for all households, for the categories "English", "Spanish: Linguistically Isolated", "Spanish: Not Linguistically Isolated", "Asian or Pacific Island Language: Linguistically Isolated", "Asian or Pacific Island Language: Not Linguistically Isolated", "Other Language: Linguistically Isolated" and "Other Language: Not Linguistically Isolated", where the categories are jointly based on the responses of all persons in a household to response items in the ODB 32 regarding Language Spoken at Home, Ability to Speak English and Age.

E. Fundamental Principles and Concepts of the Invention

As described, the purpose of the present invention is to construct a new database from existing databases when the original data to construct the new database is not directly available but is present in modified form in the existing databases. As has also been described, a property of a database has been defined herein as a type or class of information represented by the values stored in the database, that is, by the data stored in the data elements of the database, and a characteristic of a database is defined as the distribution of values occurring for a property, in a database.

According to the present invention a new database, such as an RDB 12, is constructed from the existing databases, such as an FSDB 14 and an SSDB 16, by first selecting from an FSDB 14 data records potentially having the characteristics, referred to herein as construction characteristics, which are to be used in constructing the RDB 12, that is, that may appear in the RDB 12 data record entries or be used to select the data records that are to appear in the RDB 12. It will be understood that an RDB 12 will be constructed from part or all of the data records of a FSDB 14, depending upon which of the FSDB 14 data records possess or potentially possess the construction characteristic of the RDB 12. An RDB 12 will normally, though not necessarily, include all of the data elements of the FSDB 14 data records.

For example, and referring to the above discussed examples, only a part of the data records in a given PUMS 42 corresponding to PUMAs 42a, 42b and 42d will have the geographic location characteristic of falling within the geographic area of RDBA 46. On the other hand, all of the data records in the PUMA 42 corresponding to PUMA 42c necessarily have this geographic location characteristic.

The selection of data records from FSDB 14 is then confirmed and, as necessary, adjusted by simultaneously and jointly modeling and comparing two or more other selected characteristics from the data entries of the selected FSDB 14 data records against the corresponding distribution characteristics of the SSDB 16 data record entries for the RDB 12 segment which overlaps the PUMS. These characteristics, or properties, are referred to herein as modeling characteristics, or properties, because they are used specifically to confirm and guide the selection of FSDB 14 data records against the corresponding SSDB 16 characteristics for the RDB 12. Their use as confirmation characteristics or properties in turn requires that they are direct or modified sets or subsets of certain FSDB 14 characteristics.

For example, and referring to the above discussed examples, it is known that the characteristics of at least some of the STFTs 40 are suitable as modeling characteristics because their data records have the geographic location characteristic of being located within the RDBA 46, so that these data records are represented, directly or by implication, in the characteristics of the RDB 12, and because their geographic location characteristic also is within one of the PUMAs 42, so that these data records are also represented, directly or by implication, in the characteristics of the FSDB 14 data records to be used in constructing the RDB 12. It is further known that others of the STFT 40 characteristics overlap corresponding FSDB 14 characteristics and are thus suitable modeling characteristics because they represent aggregate distributions of corresponding characteristics of the FSDB 14 data records. In this regard, it will be understood that the modeling characteristics may not also be members of the construction characteristics, that is, that the two sets of characteristics are mutually exclusive.

These modeling properties may include simultaneously the properties of one or more classes of reporting entities and sub-entities thereof. For example, and referring to the above discussed examples, they may include, simultaneously, the properties of occupied housing units, of the households and persons who occupy those housing units, of vacant housing units and of persons living in group quarters.

The selection of FSDB 14 data records to be used in constructing RDB 12 is then prospectively adjusted according to the results of the modeling and confirmation process until an acceptable level of modeling, or match, is achieved between the several modeling characteristics of the FSDB 14 subset and those of the SSDB 16 for the overlapping RDB 12 segment. At this point the prospective selection of FSDB 14 data records will have a significant and acceptable probability of having the characteristics which are to appear in the RDB 12 or to be used in generating the characteristics of RDB 12, and RDB 12 may be extracted or otherwise constructed from the information contained in these data records and from the results of the modeling and confirmation process.

The selection or construction of data records for inclusion in RDB 12 from data records in FSDB 14, as described below, is performed on a reporting-entity basis, thereby preserving the relationships between such entities and any and all sub-entities thereof, such as, for example, the relationships among persons in a household and between the persons in the household and housing unit which they occupy.

Further, it will be understood by those of skill in the art that the above described method may be executed between several source databases, either concurrently or sequentially. It will also be understood that the resultant database may be used, with minor modifications, recursively as the source database for modeling the characteristics of a subset of the RDB 12 corresponding to a subset of the RDB 12 population set, such as the population of a subarea of RDBA 46.

Finally, it should be noted that, as a rule, the greater the number of modeling characteristics used to confirm the selected FSDB 14 data records against corresponding SSDB 16 data records, the greater will be the accuracy of the representation of all the other resultant properties constructed or generated for RDB 12.

F. Detailed Discussion of the Method of the Present Invention (FIG. 6)

Figure 6A:
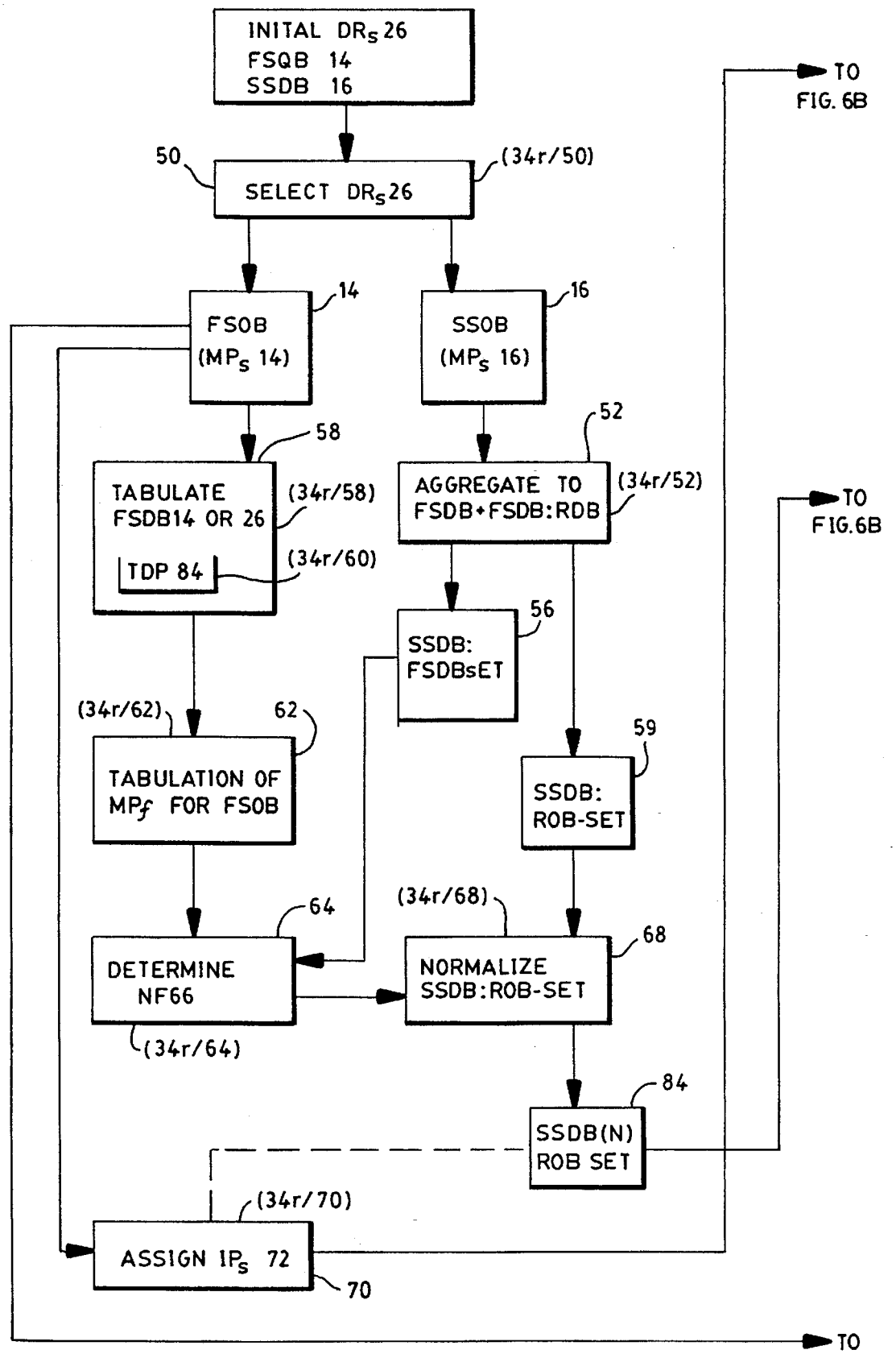
Figure 6B:
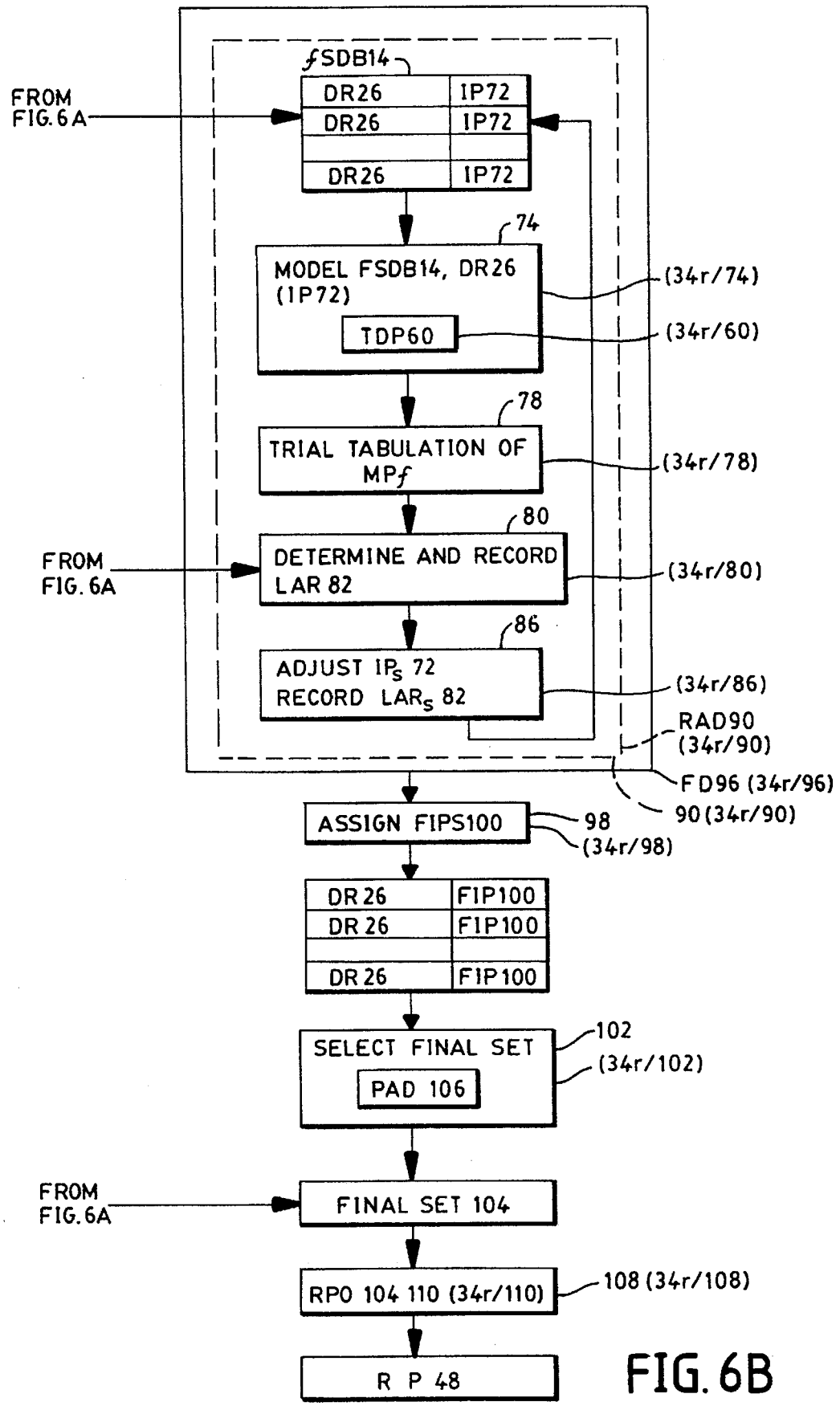

The method of the present invention is illustrated in further detail in FIG. 6, which shows both the fundamental and general steps and mechanisms of the present invention and those steps and mechanisms as applied in the illustrative example of the construction of an RDB 12 having the individual person, household and housing unit characteristics of a PUMS and the geographic characteristics of a user defined geographic area comprised of one or more STF tabulation census areas. FIG. 6 illustrates the steps performed according to the method of the present invention and the data structures and other elements referred to in the following discussion of the method of the present invention. It will be understood by those of skill in the art that the following steps are executed by a corresponding routine of COPs 34r, each of which controls the operation of Processor 22 as a dedicated processor, to perform the corresponding described operation; it will be noted in the following description and in FIG. 6 that the COP 34r routines for each step are designated, in association with each corresponding step, as a COP 34r/x wherein x designates a corresponding specific COP 34r routine and thereby the existence, for that step, of Processor 22 as a dedicated mechanism performing the operation described for that step.

As illustrated therein, the method of the present invention simultaneously constructs one or more Resultant Properties (RPs) 48 property for an RDB 12 by:

(Step 50): Select the DR 26s of FSDB 14 and SSDB 16 that contain the FSDB 14 and SSDB 16 modeling properties, hereafter respectively referred to as Modeling Properties (MPs) 14 and 16, that are to be used in the construction of the RPs 48.

This step may be necessary, for example, when FSDB 14 contains more than one set of DRs 26 and wherein certain of the sets of DRs 26 do not contain one or more of the necessary modeling properties. This does not generally mean the exclusion of those DRs 26 in which the value of the characteristic is zero, unless the exclusion of records having a value of zero for the characteristic is indicated by the aggregate population characteristics of the RDB 12, as a value of zero is generally a valid representation of a characteristic.

In the illustrative examples discussed herein above, the RDB 12 is to contain characteristics representing the detailed, individual information regarding, for example, age, income, education and so forth on a personal, household or housing unit basis, as taken from these characteristics in a PUMS, and to contain a geographic characteristic defined by a user and comprised of one or more STF tabulation census areas, thereby combining characteristics of the two types of databases. This geographic property is inferred by selecting a subset of PUMS households, persons and housing unit records which, in aggregate, match the household, person and housing unit characteristics of these STF tabulation areas. FSDB 14 may therefore be comprised of one or more PUMSs and SSDB 16 of one or more STF tabulations and the process as implemented through the present invention is to determine, for the aggregation of those census STF tabulation areas which are contained in both the PUMA for a PUMS and the RDBA, those PUMS data records which may, for purposes of constructing the RDB 12, be contained within that area. The result of the operation in Step 50 may therefore be to select, for one iteration of the method, only a single PUMS which overlaps the RDB 12, thereby eliminating from current consideration other PUMSs which may or may not overlap the RDB 12. The other PUMSs which overlap the RDB may then be successively processed according to the invention described herein and the geographic property of being included in the RDB 12 added to the data records in those PUMSs until of the PUMSs which overlap the RDB 12 and all of the PUMS records which may potentially have the desired geographic characteristic have so been processed.

If there are classes of DRs 26 which are small relative to the total number of DRs 26 in FSDB 14 and which contain only a small set of the MPs 14, these may either be independently assigned in a first reiteration of the method or be jointly assigned in a single iteration for all of the DRs 26 in FSDB 14 that contain any of the MPs 14. In the former method, the MPs 16 in the SSDB 16 must be accordingly adjusted as indicated below. To illustrate, an example of such partial overlap of modeling properties, DRs 26 for the two classes of occupied housing units or households and vacant housing units in a PUMS FSDB 14 may include a single MP 14, such as Year Structure Built, whose distribution which might only be reported in the census STF tabulations SSDB 16 for all housing units, although numerous other modeling properties might be reported separately in SSDB 16 for vacant and all occupied housing units separately. In the case where a class of DRs 26 shares no modeling characteristics with another class of DRs 26, the two classes can straightforwardly be processed and cumulated in the RDB 12 in two separate and entirely independent iterations of the method.

(Step 52): Aggregate (sum) the selected SSDB 16 tabulations to obtain all modeling properties for the current RDB 12 set, SSDB:RDB 54, and for the entire FSDB 14 set (including that portion of the selected FSDB 14 records DRs 26 which are outside of the RDB 12), SSDB:RDB 56, and, if another class of DRs 26 of FSDB 14 has been pre-assigned in an earlier iteration of the method of the present invention, as described herein above in Step 50, and if that class shares one or more modeling properties with the present class, also decrement the corresponding SSDB 16 tabulations for the SSDB:RDBs 54 and 56 by the corresponding RPs 48 as recorded in the earlier iteration of the model. It is noted that tabulation properties are additive, in that the tabulation properties (tabulations) for two tabulation sets are the sum of separate tabulations for the two sets, which in this case are tabulation area population sets. (Some properties of STF records may not be tabulations; they are therefore not additive and not used as modeling properties.)

(Step 58): Tabulate the DRs 26 of FSDB 14, weighting each record by its sampling weight (if any), that is, for each level of the MP 16, by enumerating the (weighted) number of such DRs 26 of FSDB 14 having a value of the corresponding MP 14 which matches or falls within the range corresponding to a level of the MPs 16, or, if the modeling property is a compound property, having the values of the corresponding MPs 14 which jointly match of fall within the tabulation range corresponding to a level of the MPs 16. This is referred to herein as a Tabulation Operation (TOP), which is discussed further herein below. This operation is designed, and for purposes of the invention described herein, assumed to be the same as the modeling operation used to derive the SSDB 16 tabulations from the original database ODB 32 records.

It will be noted, referring to the illustrative example used herein, that the resulting Tabulations 62 of the modeling properties for the FSDB 14 have the same statistically expected values as the modeling properties as the aggregated tabulations of the SSDB 16 for the FSDB 14 set, SSDB:FSDB-set 56, but because the FSDB 14 may include only a sample, in the case of the PUMS a 5% sample, of the original data from which the SSDB 16 is derived, the actual values of the modeling properties in the Tabulations 62 may differ from these values due to sampling error.

(Step 64): Determine a Normalizing Factor (NF) 66 for each level of each MP 16 by comparing the value of the level in thee FSDB 14 Tabulation 62, that is, by multiplying each level of each MP 16 in SSDB:RDB-set 54 by the NF 66 for the corresponding level.

(Step 68): Normalize each level of each modeling property in SSDB:RDB 54 to the level in the FSDB 14 Tabulation 62, that is, by multiplying each level of each MP 16 in SSTF:RDB-set 54 by the NF 66 for the corresponding level.

This step may be necessary due to possible discrepancies between the distributions of MP 14 values in the DRs 26 of FSDB 14 and the aggregations of DRs 26 in SSDB 16, 56 and 54, possibly due to sampling and non-sampling variations. Without normalization, such discrepancies may bias the results of the Fitting Operation (FO) described herein below and the selection of Final Set, also described herein below.

(Step 70): For the selected FSDB 14 DRs 26, assign an initial Inclusion Probability (IP) 72 to each selected DR 26 wherein each IP 72 represents the probability that the corresponding FSDB 14 DR 26 is to be included in the construction of a RP 48 and has a value greater than 0 and no greater than 1. These initial IPs 72 may be assigned arbitrarily, or according to any criteria available and useful to the user.

In summary to this point, and referring to the illustrative example of constructing an RDB 12 from PUMSs and STF tabulations, the method of the present invention has identified groups of FSDB 14 microdata DRs 26 and SSDB 16 tabulation DRs 26 which meet the above discussed criteria of possessing congruent characteristics. These characteristics are also congruent with part or all of the RDB 12. The process has normalized the SSDB 16 tabulation DRs 26 to insure that such congruence is not distorted by unavoidable sampling variability ("noise") and has assigned an initial probability of inclusion in the Final Set to each of the selected FSDB 14 DRs 26.

(Step 74): By operation of TOP 60, model one MP 14 of the included FSDB 14 DRs 26, that is, against the corresponding MP 16 of SSDB 16, for example, by tabulating each FSDB 14 MP 14, multiplied by the sampling weight for the record, if any, of all the included FSDB 14 DRs 26, according to which level of the MPs 16 the MPs 14 of each FSDB 14 DR 26 matches, or if the MP 16 is a compound property, according to which level of the MPs 16 the MPs 14 of each FSDB 14 DR 26 jointly match. This Trial Tabulation 78 represents the (weighted) frequencies of RDB 12 DRs 26, corresponding to the different levels of the modeling properties, that would be expected statistically to result from a Probabilistic Assignment Operation (PAO), described herein below, with a current trail set of IPs 72.

(Step 80): Determine a Level Adjustment Ratio (LAR) 82 for each level of the modeling properties, equal to the ratio of the value for the level of the modeling property as normalized in SSDB(N):RDB 84 to the value of the corresponding level of the Trial Tabulation 78.

(Step 86): Record the LAR 82 for each level of the modeling property and adjust (multiply) the IP 72 for each FSDB 14 DR 26 by the LAR 82 for the level as determined by the value of the MP 14 for the FSDB 14 DR 26 to determine a new IP 72 for each included FSDB 14 DR 26 except if the resulting IP 72 for an FSDB 14 DR 26 would exceed 1.0, in which case the excess probability, that is, the amount by which the resulting IP 72 exceeds 1.0, is shifted to other FSDB 14 DRs 26 with the same or similar modeling property characteristics. This limitation on the IP 72s insures that the expected value (frequency) of each level of modeling property after the operation of the PAO described below is equal to the value of the corresponding level of the modeling properties, as normalized in SSDB(N):RDB 840. Such "shifting" of the resulting IPs 72 is more likely to be necessary the larger is the RDB 12 population set relative to the PUMS population set and the larger the number of modeling properties MP 14 and MP 16.

In the example discussed herein above, this step compares the data records of the STF tabulation having a geographic property matching that of the desired RDB 12 or portion thereof with the expected selection of PUMS data records to be included in the Final Set to evaluate the accuracy with which the expected characteristics of the prospectively selected and included PUMS data records reflect the corresponding properties of the STF tabulation and then adjusts the expected selection of PUMS data records by modifying their IPs 72 so that the expected characteristics of the prospectively selected and included PUMS data records match the corresponding properties of the STF tabulation. To illustrate, the aggregate STF tabulations making up the RDB-PUMA set may comprise a higher proportion of low to middle income households than the non-RDB-PUMA set and therefore result in lower value IPs 72 being assigned to PUMS DRs 26 having high values for household income.

(Step 90): Repeat the Ratio Adjustment Operation 92, comprised of Steps 74 through 86, above, for each of n(n>1) included modeling properties and the corresponding modeling properties, recording the maximum and minimum LAR 82 after each such operation.

(Step 94): Repeat the Fitting Operation (FO) 96, comprised of Step 90, until one of two conditions is satisfied, either the maximum and minimum LAR 82 both fall within a specified tolerance band, (1−tol)<(1+tol), or the FO 96 has been iterated a specified number of times. In practice, (1) if tol is less than 0.1, the tolerance criteria may be satisfied only when the number of levels of the modeling properties is small relative to the number of DRs 26 in FSDB 14, and (2) the maximum and minimum LAR 82 converge only minimally toward one beyond 5 to 8 reiterations of the FO 96.

(Step 98): Assign a Final Inclusion Probability (FIP) 100, in the range between 0 and 1, inclusive, to each DR 26 of FSDB 14, equal to the modified final prospective IPs 72 from Step 94, above.

(Step 102): Select a Final Set (FS) 104 of FSDB 14 DRs 26 to be used in constructing all RPs 48 by including a DR 26 of FSDB 14 DR 26 in the FS 104 when the FIP 100 of the DR 26 is so selected in a Probabilistic Assignment Operation (PAO) 106. In a PAO 106, as defined for purposes of the present invention, a random number is selected from the uniform probability distribution between the values 0 and 1, and the DR 26 is selected for inclusion in the FS 104 if and only if this random number exceeds the FIP 100 for the FSDB 14 DR 26.

(Step 108): Construct all of the RPs 48 for the RDB 12 by perforating a Resultant Property Operation (RPO) 110, which is a TOP 60, on the values of properties, including the modeling properties, appearing in the Final Set 104, wherein the RDB 12-included records are weighted by their sampling weights, if applicable. These tabulation properties are recorded for use as inputs in later iterations of the method of the present invention and for use in evaluating the overall match between properties of RDB 12 and the modeling properties and other congruent properties of SSDB 14.

Finally, essential aspects of the operation of the present invention as described above is further illustrated in the BASIC language code listings provided in Appendix A hereto.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the the spirit and scope of the invention.

A-1

```
1000 ! ONEHHN:
1010 !           Modified for RDBA from LISTPRGB for BECO 2-1-95
1020 !           Iteratively to assign occupied units:households
1030 !           to up to four subareas of one PUMA.
1040 !           Revised 2-15-95
1050 LIBRARY
"\tru\mycode\PUMSDDEX","\tru\mycode\RACE1DEX","\tru\mycode\ANCS1DEX","\tru\tblibs\srtsrctk
\sortlib"
1060
1070 declare def SUM2B,PPROP,SEF
1080
1090 dim IP$(25), v3(25),v4(25),v5(25),pwgt(25)
1100 dim  hhin1(7000),persons(7000),houswgt(7000),    Base_Prob(2),Max_PCA(2)
1110 dim vwk(2),sumneg(2),   CSE_Log(100)
1120
1130 ! Run-specific parameters
1140 let High_Enough=.02
1150 let N_IASS=20
1160 let n_iter=6
1170 mat redim CSE_Log(N_IASS)
1180
1190 !  =================== File initializations
1200 input prompt "PUMA and subdirectory ####\ABC?": pu$
1210
1220 let pudir$ = "C:\RDBA\P"&pu$&"\"
1230 let al$ = pu$[6:6]
1240
1250 ! Not necessary to open the target matrix to determine NISA
1260 let nisa = 4
1270
1280 ! Non-Household PUMA Tabs, from earlier iteration
1290 dim dh_4(2,9),dp_3(2,9),dp_4(2,99),dp_5(2,9)
1300
1310 ! Initialize target matrices
1320 ! Dimensions and variable names changed for patent submission.
1330 dim h_1(4,9),h_2(4,9),h_3(4,9),h_4(4,9)
1340 dim h_5(4,99),h_6(4,99),p_1(4,99),p_2(4,99)
1350 dim p_3(4,9),p_4(4,99),p_5(4,9),p_6(4,9),p_7(4,9)
1360
1370 open #7: name pudir$&"hhlog.prn", org text, create newold, access outin
1380 erase #7
1390 set #7: pointer end
1400 set #7: margin    506
1410 set #7: zonewidth 8
1420
1430 for isa=1 to nisa-1            !!==========ISA loop========!!
1440 print #7: "Starting ISA",isa
1450
1460 !! Set up directories for tree structure: Root-2-3-4
1470 let step$=using$("#",isa)
1480 let nextstep$=using$("#",isa+1)
1490 let outdir$ = pudir$[1:14]&"FINAL\"
1500
1510 let in_pac_fi$=pudir$&"packed"&step$&".ext"
1520 let out_pac_fi$=pudir$&"packed"&nextstep$&".ext"
1530 let in_txt_fi$=pudir$&"HH"&step$&".txt"
1540 let out_txt_fi$=pudir$&"HH"&nextstep$&".txt"
1550
1560 open #3: name pudir$&"stf3tgtx.prn", create old, org text, access input
1570
1580 call In_Target_Matrix(h_1)     ! First housing unit|household variable
1590
1600 !! Check if either target is null
1610 let checksum1,checksum2=0
1620 for j=1 to 20
1630      let checksum1=checksum1+h_1(1,j)
1640      let checksum2=checksum2+h_1(2,j)
1650 next j
1660 ! If residual area is null, then you are done.
1670 if checksum2=0 then
1680    print "Move outputs of last iteration to Final Directory. Done."
1690    print isa-1, "ISAs processed."
```

A-2

```
1700     print #7: "Move outputs of last iteration to Final Directory. Done."
1710     close #3
1720     STOP
1730 ! If target area is null, then rename output of previous step as
1740 !    output of this step to be passed to next.
1750 else if checksum1=0 then
1760     close #3
1770     call shell("rename "&in_txt_fi$&" HH"      &nextstep$&".*")
1780     call shell("rename "&in_pac_fi$&" packed" &nextstep$&".*")
1790
1800 ! Rest of ISA loop
1810 else
1820
1830
1840 call In_Target_Matrix(h_2)        ! Second housing unit|household variable
1850 call In_Target_Matrix(h_3)        ! Third housing unit|household variable
1860 call In_Target_Matrix(h_4)        ! Fourth housing unit|household variable
1870 call In_Target_Matrix(h_5)        ! Fifth housing unit|household variable
1880 call In_Target_Matrix(h_6)        ! Sixth housing unit|household variable
1890 call In_Target_Matrix(p_1)        ! First person variable
1900 call In_Target_Matrix(p_2)        ! Second person variable
1910 call In_Target_Matrix(p_3)        ! Third person variable
1920 call In_Target_Matrix(p_4)        ! Fourth person variable
1930 call In_Target_Matrix(p_5)        ! Fifth person variable
1940 call In_Target_Matrix(p_6)        ! Sixth person variable
1950 for ii=1 to 36
1960     line input #3: smoke$
1970 next ii
1980 call In_Target_Matrix(p_7)        ! Seventh person variable
1990 close #3
2000
2010 !==========Read and Tabulate All Sample Variables
2020
2030 ! Extract file of variables in packed format.
2040 open #1: name in_pac_fi$, org byte, create old, access input
2050 open #6: name "d:\temp.pum", org byte, create newold, access outin
2060 erase #6
2070
2080 open #11: name "d:\vh1.var", org random, create newold, access outin, recsize 10
2090 erase #11
2100 open #12: name "d:\vh2.var", org random, create newold, access outin, recsize 10
2110 erase #12
2120 open #13: name "d:\vh3.var", org random, create newold, access outin, recsize 10
2130 erase #13
2140 open #14: name "d:\vh4.var", org random, create newold, access outin, recsize 10
2150 erase #14
2160 open #15: name "d:\vh5.var", org random, create newold, access outin, recsize 10
2170 erase #15
2180 open #16: name "d:\vh6.var", org random, create newold, access outin, recsize 10
2190 erase #16
2200 open #17: name "d:\vp1.var", org random, create newold, access outin, recsize 10
2210 erase #17
2220 open #18: name "d:\vp2.var", org random, create newold, access outin, recsize 10
2230 erase #18
2240 close #18
2250 open #19: name "d:\vp7.var", org random, create newold, access outin, recsize 10
2260 erase #19
2270 open #18: name "d:\vp2.var", org random, create newold, access outin, recsize 10
2280
2290 read #1, BYTES 10: IH$
2300 let inh=1
2310 write #6: IH$
2320
2330 do
2340     ! unpackb Household Variables
2350     let PERSONS(inh)=unpackb(IH$,1,7)
2360
2370     let HOUSWGT(inh)=unpackb(IH$,65,12)
2380
2390     call htab(h_1,9,8)
2400     write #11: vtemp
2410     call htab(h_2,17,4)
```

A-3

```
2420        write #12: vtemp
2430        call htab(h_3,25,8)
2440        write #13: vtemp
2450        call htab(h_4,21,4)
2460        write #14: vtemp
2470        call htab(h_5,33,4)
2480        write #15: vtemp
2490        call htab(h_6,37,4)
2500        write #16: vtemp
2510        call htab(p_1,41,16)
2520        write #17: vtemp
2530        call htab(p_2,57,8)
2540        write #18: vtemp
2550        call htab(p_7,77,4)
2560        write #19: vtemp
2570        !
2580        ! Tabulate Person Records
2590        for ip=1 to PERSONS(inh)
2600           read #1, BYTES 5: IP$(ip)
2610           let inp=inp+1
2620           write #6: IP$(ip)
2630
2640           ! unpackb Person Variables
2650           let v3(ip)=unpackb(IP$(ip),1,8)
2660           let v4(ip)=unpackb(IP$(ip),9,8)
2670           let v5(ip)=unpackb(IP$(ip),17,8)
2680           let PWGT(ip)=unpackb(IP$(ip),25,16)
2690
2700           let p_3(3,v3(ip)) = p_3(3,v3(ip)) +PWGT(ip)
2710           let p_4(3,v4(ip)) = p_4(3,v4(ip)) +PWGT(ip)
2720           if v5(ip)<18 then let p_5(3,v5(ip)) = p_5(3,v5(ip)) +PWGT(ip)
2730        next ip
2740
2750        if more #1 then
2760           read #1, BYTES 10: IH$
2770           let inh=inh+1
2780           write #6: IH$
2790        end if
2800 loop while more #1
2810 close #1
2820
2830 let hh_count = inh
2840 print #7: hh_count,"households counted in ISA"
2850 mat redim hhin1(hh_count)
2860 mat hhin1=0
2870
2880 ! Create scale-ratio file
2890 let ratfile$="d:rat"&pu$[1:2]&pu$[4:4]&pu$[6:6]&using$("#",isa)&".prn"
2900 open #77: name ratfile$, org text, access outin, create newold
2910 erase #77
2920 for ii=1 to inh
2930     print #77: "
"
2940 next ii
2950 close #77
2960
2970 ! Check Consistency of Target Marginal Sums
2980 !    NOTE: The STF3 counts of occupied housing (Housing Tables)
2990 !          differ from householder-based counts of households
3000 !          (Population Tables) by up to 2.1%, e.g., in REst of
3010 !          State, PUMA(2)=3100 [diff=290/13600].
3020 call Chek_Targets
3030
3040 ! Adjust Targets for Non-Household (Populations)
3050 ! Decrement Assigned Subarea GQ Populations & Vacant Units
3060 open #4: name pudir$&"aspuvu"&step$&".tab", org stream, create newold, access outin
3070 open #5: name pudir$&"aspugq"&step$&".tab", org stream, create newold, access outin
3080 mat read #4: dh_4
3090 mat read #5: dp_3,dp_4,dp_5
3100 close #4
3110 close #5
3120
```

A-4

```
3130 call Decr_Target(h_4,dh_4)
3140 call Decr_Target(p_3,dp_3)
3150 call Decr_Target(p_4,dp_4)
3160 !Note: No direct information on total household employed population in area
3170 call Decr_Target(p_5,dp_5)
3180
3190 ! Check Consistency of Target Marginal Sums
3200 !call Chek_Targets
3210
3220 ! Store decremented, unscaled targets for Assignment/Simulations
3230 open #30: name "d:\targets.tab", org byte , create newold, access outin
3240 erase #30
3250 mat write #30: h_1,h_2,h_3,h_4,h_5,h_6,p_1,p_2,p_3,p_4,p_5,p_7
3260 close #30
3270
3280 ! Scale All Targets to ISA Marginals
3290 call Scale_Target(h_1,"h_1",1,  9)
3300 call Scale_Target(h_2,"h_2",1,  9)
3310 call Scale_Target(h_3,"h_3",1,  9)
3320 call Scale_Target(h_4,"h_4",1,  9)
3330 call Scale_Target(h_5,"h_5",1, 99)
3340 call Scale_Target(h_6,"h_6",1, 99)
3350 call Scale_Target(p_1,"p_1",1, 99)
3360 call Scale_Target(p_2,"p_2",1, 99)
3370 call Scale_Target(p_3,"p_3",1,  9)
3380 call Scale_Target(p_4,"p_4",1, 99)
3390 call Scale_Target(p_5,"p_5",1,  9)
3400 call Scale_Target(p_7,"p_7",1,  9)
3410
3420 !line input prompt "Continue Y or N??": cont$
3430 !if cont$="N" then stop
3440
3450 ! Check Consistency of Target Marginal Sums
3460 call Chek_Targets
3470
3480 ! Pre-Assign Households With High PCA^
3490 mat redim hhin1(hh_count)
3500 mat hhin1=0
3510 set #6: pointer begin
3520
3530 ! Find Base Household Probabilities of Random Household in Area 1 | 2
3540 mat Base_Prob=0
3550 for i=1 to 20
3560     let Base_Prob(1)=Base_Prob(1)+h_1(1,i)
3570     let Base_Prob(2)=Base_Prob(2)+h_1(2,i)
3580 next i
3590 let temp = Base_Prob(1)+Base_Prob(2)
3600 let Base_Prob(1) = 1 - Base_Prob(1) / temp
3610 let Base_Prob(2) = 1 - Base_Prob(1)
3620 mat Max_PCA=0
3630
3640 print time$
3650 let inh=0
3660 call Next_H
3670
3680 do while more #6
3690     mat Max_PCA=0
3700
3710     ! Calculate Maximum Expected Probability of Correct Assignment
3720     call PHMax_PCA(h_1,9,8)
3730     call PHMax_PCA(h_2,17,4)
3740     call PHMax_PCA(h_4,21,4)
3750     call PHMax_PCA(h_3,25,8)
3760     call PHMax_PCA(h_5,33,4)
3770     call PHMax_PCA(h_6,37,4)
3780     call PHMax_PCA(p_1,41,16)
3790     call PHMax_PCA(p_2,57,8)
3800     call PHMax_PCA(p_7,77,4)
3810
3820     let IG$=IG$[6:135]
3830
3840     for ip=1 to PERSONS(inh)
```

A-5

```
3850        let IG$=IG$[6:135]
3860        call PHMax_PCA(p_3,1,8)
3870        call PHMax_PCA(p_4,9,8)
3880        if unpackb(IG$,17,8)<18 then call PHMax_PCA(p_5,17,8)
3890    next ip
3900
3910    ! Assign Household if Probability is High Enough
3920    If Max_PCA(1)>Max_PCA(2) then
3930        let imax=1
3940    else if Max_PCA(1)<Max_PCA(2) then
3950        let imax=2
3960    else if Max_PCA(1)=Max_PCA(2) then
3970        print #7: "Encountered PUMA household outside of STF 3 range--WARNING"
3980        print #7: "ISA=", isa, "HH=", inh
3990        print "Encountered PUMA household outside of STF 3 range--WARNING"
4000        print "ISA=", isa, "HH=", inh
4010 !      stop
4020    end if
4030
4040    if (1-Max_PCA(imax))<Base_Prob(imax)*High_Enough then
4050        let hhin1(inh)=imax
4060        print #7: "HH #",inh,"to,",imax,"EPCA=",Max_PCA(imax)
4070    else if HOUSWGT(inh)=0 then
4080        let hhin1(inh)=2
4090        print #7: "HH #",inh,          "assigned to Area 1, WEIGHT=0!!?"
4100    end if
4110
4120    call Next_H
4130
4140 loop
4150 print time$
4160 call Report_Assignments
4170
4180 ! Move Original, Scaled PUMA Totals to Final Column of Target Matrices
4190 call Right_Shift_Vector(h_1)
4200 call Right_Shift_Vector(h_2)
4210 call Right_Shift_Vector(h_3)
4220 call Right_Shift_Vector(h_4)
4230 call Right_Shift_Vector(h_5)
4240 call Right_Shift_Vector(h_6)
4250 call Right_Shift_Vector(p_1)
4260 call Right_Shift_Vector(p_2)
4270 call Right_Shift_Vector(p_3)
4280 call Right_Shift_Vector(p_4)
4290 call Right_Shift_Vector(p_5)
4300 call Right_Shift_Vector(p_7)
4310
4320 !!! Adjust Target Matrices for Pre-Assignments
4330 set #6: pointer begin
4340 print time$
4350
4360 let inh=0
4370 call Next_H
4380 mat sumneg=0
4390
4400 do while more #6
4410     if hhin1(inh)>0 then let aflag=1 else let aflag=0
4420     call ATM(aflag)
4430 loop
4440
4450 print #7: "Sum of over-allocated households, Areas 1, 2"
4460 mat print #7: sumneg
4470 print time$
4480
4490 ! Check Consistency of Target Marginal Sums
4500 call Chek_Targets
4510
4520 ! Do N Rounds of Ratio Adjustments
4530 for iter=1 to n_iter!              n_iter
4540     call Ratio_PVar(p_4,9,8,"p_4")
4550     call Ratio_PVar(p_5,17,8,"p_5")
4560     call Ratio_PVar(p_3,1,8,"p_3")
```

A-6

```
4570        mat redim vwk(hh_count)
4580        call Ratio_TVar(h_4,#14,"h_4")
4590        call Ratio_TVar(p_1,#17,"p_1")
4600        call Ratio_TVar(h_2,#12,"h_2")
4610        call Ratio_TVar(h_3,#13,"h_3")
4620        call Ratio_TVar(h_5,#15,"h_5")
4630        call Ratio_TVar(h_6,#16,"h_6")
4640        call Ratio_TVar(p_2,#18,"p_2")
4650        call Ratio_TVar(p_7,#19,"p_7")
4660        call Ratio_TVar(h_1,#11,"h_1")
4670
4680     !!! Adjust Target Matrices for Over-Assignments
4690     if iter<n_iter then
4700        set #6: pointer begin
4710        let inh=0
4720        do while more #6
4730           call Next_H
4740           if hhin1(inh)=0 and HOUSWGT(inh)>unpackb(IG$,65,12) then let
HOUSWGT(inh)=unpackb(IG$,65,12)
4750        loop
4760     end if
4770
4780  ! Write scale-ratio log
4790  close #19
4800  open #77: name ratfile$, org byte, access outin, create newold
4810  let b1=(iter-1)*7+1
4820  for inh=1 to hh_count
4830     set #77: record b1
4840     write #77: using$("###.##",HOUSWGT(inh)*max(1-hhin1(inh),0))
4850     let b1=b1+71
4860  next inh
4870  close #77
4880  open #19: name "d:\vp7.var", org random, create newold, access outin, recsize 10
4890
4900  next iter
4910
4920  ! Calculate assignment ratios & write them to stream file===========
4930  close #19
4940
4950
4960
4970  set #6: pointer begin
4980  let inh=0
4990
5000  do while more #6
5010     call Next_H
5020     let temp=unpackb(IG$,65,12)
5030     if hhin1(inh)=0 then let hhin1(inh)=2-HOUSWGT(inh)/temp
5040     let HOUSWGT(inh)=temp
5050                              ! Now    HOUSWGT = Original    !!!!!!!
5060  loop
5070  close #6
5080
5090  ! Level excess probabilities
5100  call Level_XProb(1,hh_count,1)
5110  call Level_XProb(hh_count,1,-1)
5120
5130  !
5140
5150
5160
5170
5180
5190
5200  ! Transcribe scale-ratios to main log
5210  open #77: name ratfile$, org byte, access input, create old, recsize 71
5220  Print #7: "Scale-ratio log"
5230  for inh=1 to hh_count
5240     read #77: ih$
5250     let b1=1
5260     for ii=1 to n_iter
5270        let e1=b1+5
```

A-7

```
5280         if HOUSWGT(inh)>0 then let
ih$[b1:e1]=using$("##.###",val(ih$[b1:e1])/HOUSWGT(inh))
5290         let b1=b1+7
5300      next ii
5310      print #7: ih$[1:69]
5320 next inh
5330 close #77
5340
5350 ! Read random numbers from file.
5360 open #30: name "c:\GMS\tenkrand.dat", org stream, create old, access input
5370 mat redim PERSONS(hh_count)
5380 mat read #30: PERSONS      !!!!!! ~ A_Probs
5390 close #30
5400
5410 !!!!!!!!!!!!!!!!!!!!!!!!!!!!!!
5420 ! Note: Block of proprietary code not part of patent application
5430 !       deleted here.
5440 !!!!!!!!!!!!!!!!!!!!!!!!!!!!!!
5450
5460
5470 ! Write PUMS & Packed HH records for subsequent|final subareas
5480
5490 ! Original extract of PUMS cases or Output of previous step
5500 open #31: name in_txt_fi$, org byte, create old, access input, recsize 233
5510 open #6: name "d:\temp.pum", org byte, create old, access input
5520
5530 open #11: name out_pac_fi$, org byte, create newold, access outin
5540 erase #11
5550 open #32: name outdir$&"HH"&al$&step$&".txt", org byte, create newold, access outin,
recsize 233
5560 erase #32
5570 open #33: name out_txt_fi$, org byte, create newold, access outin, recsize 233
5580 erase #33
5590
5600 for inh=1 to hh_count
5610     read #6, bytes 10: IH$
5620     let SPER=unpackb(IH$,1,7)
5630     read #6, bytes 5*SPER: IP$(1)
5640     read #31: HUREC$
5650     read #31, bytes 233*SPER: PERREC$
5660     if (2-hhin1(inh))>=PERSONS(inh) then
5670         write #32: HUREC$, PERREC$
5680     else
5690         write #11: IH$, IP$(1)
5700         write #33: HUREC$, PERREC$
5710     end if
5720
5730 next inh
5740 close #6
5750 close #11
5760 close #31
5770 close #32
5780 close #33
5790
5800 end if    ! Avoids assignment if case is null
5810 !!=====================================
5820
5830 next isa  !!========ISA loop=================!!
5840
5850 ! Level excess probabilities
5860 sub Level_XProb(istart, istop, istep)
5870     let temp=0
5880     for i=istart to istop step istep
5890         if hhin1(i)>1 and hhin1(i)<2 then
5900             if hhin1(i)-temp>1 then
5910                 let hhin1(i)=hhin1(i)-temp
5920                 let temp=0
5930             else
5940                 let temp=temp-(hhin1(i)-1)
5950                 let hhin1(i)=1
5960             end if
5970                                  ! Close half the gap in forward direction
```

A-8

```
5980                                    ! and the other half in reverse
5990            else if hhin1(i)<1 then
6000                let tt=(.5+.25*(1-istep))*(1-hhin1(i))
6010                let temp=temp+tt
6020                let hhin1(i)=hhin1(i)+tt
6030            end if
6040        next i
6050        print #7: "Surplus probability:",temp,"direction",istep
6060 end sub
6070
6080 sub Next_H
6090     if more #6 then
6100         let inh=inh+1
6110         read #6, BYTES (10+PERSONS(inh)*5) : IG$
6120     end if
6130 end sub
6140
6150 ! Cumulates STF3 Targets for 2nd through Nth subareas
6160 sub In_Target_Matrix (m(,))
6170     let istop=ubound(m,2)
6180     let b1=(isa-1)*8 + 10
6190     let zw=8                                            ! Zonewidth parameter
6200     let e1=b1+zw-1
6210     for j=lbound(m,2) to istop
6220         let b2=b1+zw
6230         let e2=e1+zw
6240         line input #3: i1$
6250         let m(1,j)=val(i1$[b1:e1])
6260         let m(2,j)=val(i1$[b2:e2])
6270         for i=(isa+2) to nisa
6280             if i>nisa then exit for
6290             let b2=b2+zw
6300             let e2=e2+zw
6310             let m(2,j)=m(2,j)+val(i1$[b2:e2])
6320         next i
6330         let m(3,j)=0                                    ! Initialization
6340     next j
6350 end sub
6360
6370 sub htab (HMAT(,),start, len)
6380     let vtemp=unpackb(IH$,start,len)
6390     let HMAT(3,vtemp) = HMAT(3,vtemp) +HOUSWGT(inh)
6400 end sub
6410
6420 ! Decrement non-households from targets
6430 sub Decr_Target ( T_M(,), D_M(,))
6440     let istop=ubound(d_m,2)
6450     for i=1 to 2
6460         for j=1 to istop
6470             let T_M(i,j)=T_M(i,j)-D_M(i,j)
6480         next j
6490     next i
6500 end sub
6510
6520 DEF sum2b(m(,),x)
6530     LET temp = 0
6540     FOR jj=1 to ubound(m,2)
6550         LET temp = temp + m(x,jj)
6560     NEXT jj
6570     LET sum2b = temp
6580 END DEF
6590
6600 sub Scale_Target ( T_M(,), tname$, istart, istop)
6610     for i=istart to istop
6620         let temp = t_m(1,i) + t_m(2,i)
6630         if temp>0 then
6640             let ratio = t_m(3,i) / temp
6650             if (abs(ratio-1)>.75 or abs(t_m(3,i)-temp)>500) then &
6660                 & print #7: tname$,i,temp,t_m(3,i)
6670             let t_m(1,i) = t_m(1,i) * ratio
6680             let t_m(2,i) = t_m(2,i) * ratio
6690         end if
```

A-9

```
6700     next i
6710 end sub
6720
6730 sub Chek_Target ( T_M(,), tname$, istart, istop)
6740     let chek_sum1,chek_sum2,chek_sum3=0
6750     for i=istart to istop
6760         let chek_sum1 = chek_sum1 + t_m(1,i)
6770         let chek_sum2 = chek_sum2 + t_m(1,i) + t_m(2,i)
6780         let chek_sum3 = chek_sum3 + t_m(3,i)
6790     next i
6800     print #7: "Checking target sums for "&tname$&":",chek_sum1,chek_sum2,chek_sum3
6810 end sub
6820
6830 ! Check Consistency of Target Marginal Sums
6840 sub  Chek_Targets
6850     call Chek_Target(h_1,"h_1",1, 20)
6860     call Chek_Target(h_2,"h_2",1, 14)
6870     call Chek_Target(h_3,"h_3",1, 20)
6880     call Chek_Target(h_4,"h_4",1,  4)
6890     call Chek_Target(h_5,"h_5",0, 15)
6900     call Chek_Target(h_6,"h_6",1,  9)
6910     call Chek_Target(p_1,"p_1",1,315)
6920     call Chek_Target(p_2,"p_2",1,126)
6930     call Chek_Target(p_4,"p_4",1, 25)
6940     call Chek_Target(p_3,"p_3",1, 36)
6950     call Chek_Target(p_5,"p_5",1, 17)
6960     call Chek_Target(p_7,"p_7",1,  7)
6970 !       line input prompt "Continue Y or N??": cont$
6980 !       if cont$="N" then stop
6990 end sub
7000
7010 sub PHMax_PCA( GMAT(,), start, ilen)
7020     let vtemp=unpackb(IG$,start,ilen)
7030     if (GMAT(1,vtemp) / GMAT(3,vtemp)) > Max_PCA(1) then let
Max_PCA(1)=GMAT(1,vtemp)/GMAT(3,vtemp)
7040     if (GMAT(2,vtemp) / GMAT(3,vtemp)) > Max_PCA(2) then let
Max_PCA(2)=GMAT(2,vtemp)/GMAT(3,vtemp)
7050 end sub
7060
7070 sub Report_Assignments
7080     dim ct(2)
7090     mat ct=0
7100     for i=1 to hh_count
7110         if hhin1(i)>0 then
7120             let ct(1)=ct(1)+2-hhin1(i)
7130             let ct(2)=ct(2)+hhin1(i)-1
7140         end if
7150     next i
7160     print #7: "Of",hh_count,"households",ct(1),"assigned to Area 1 and"
7170     print #7: ,,ct(2), "to Area 2."
7180 end sub
7190
7200 sub Right_Shift_Vector(m(,))
7210     let istop=ubound(m,2)
7220     for i=lbound(m,2) to istop
7230         let m(4,i)=m(3,i)
7240     next i
7250 end sub
7260
7270 sub Adjust_TMat (GMAT(,),start, len, type$)
7280     let vtemp=unpackb(IG$,start,len)
7290     if type$="P" then let wgt=unpackb(IG$,25,16) else let wgt=houswgt(inh)
7300     let GMAT(3,vtemp) = GMAT(3,vtemp) - wgt
7310     let GMAT(hhin1(inh),vtemp) = GMAT(hhin1(inh),vtemp) - wgt
7320
7330     if GMAT(hhin1(inh),vtemp)<0 then
7340         print #7: "New area sum<0 ",type$&using$("###",start),hhin1(inh),vtemp,wgt
7350         print #7: GMAT(1,vtemp),GMAT(2,vtemp),GMAT(3,vtemp),GMAT(4,vtemp),inh
7360         let inot=3-hhin1(inh)
7370         let GMAT(inot,vtemp)=GMAT(inot,vtemp)+GMAT(hhin1(inh),vtemp)
7380         let sumneg(hhin1(inh))=sumneg(hhin1(inh))+GMAT(hhin1(inh),vtemp)
7390         let GMAT(hhin1(inh),vtemp)=0
```

A-10

```
7400    end if
7410 end sub
7420
7430 sub Ratio_PVar( PMAT (,), start, len, tname$)
7440     set #6: pointer begin
7450     dim sumvec(2),pvvec(25)
7460     let topval=ubound(PMAT,2)
7470     mat redim sumvec(lbound(PMAT,2):topval)
7480     mat sumvec = 0
7490
7500     let inh=0
7510     call Next_H
7520
7530     do while more #6
7540         ! In case of 0 HOUSWGT from Census Bureau
7550         if hhin1(inh)=0 then let hwrat=HOUSWGT(inh)/unpackb(IG$,65,12)
7560         let IG$=IG$[6:135]
7570         for ip=1 to PERSONS(inh)
7580             let IG$=IG$[6:135]
7590             if hhin1(inh)=0 then
7600                 let vtemp=unpackb(IG$,start,len)
7610                 let PWGT(ip)=unpackb(IG$,25,16)
7620                 if vtemp<=topval then let sumvec(vtemp)=sumvec(vtemp) + PWGT(ip)*hwrat
7630             end if
7640         next ip
7650
7660         call Next_H
7670     loop
7680
7690     let maxadj=0
7700     let minadj=1
7710     ! Check that Person counts agree.....
7720     let chek_sum1,chek_sum2=0
7730     for i=lbound(sumvec) to topval
7740         let chek_sum1=chek_sum1+PMAT(1,i)+PMAT(2,i)
7750         let chek_sum2=chek_sum2+sumvec(i)
7760     next i
7770     print #7: "Checking tgt & tab sums for",tname$,chek_sum1,chek_sum2
7780
7790     ! Calculate Adjustment Ratio For Each Cell FOR FIRST AREA
7800     for i=lbound(sumvec) to topval
7810         if sumvec(i)>0 then
7820             let sumvec(i)=PMAT(1,i)/sumvec(i)
7830             if sumvec(i)>maxadj then let maxadj=sumvec(i)
7840             if sumvec(i)<minadj then let minadj=sumvec(i)
7850         end if
7860         print #7: using$("##.###",sumvec(i)),
7870     next i
7880     print #7:
7890     print #7: "Min, Max adjustments=",minadj,maxadj,
7900
7910     ! Adjust Sample Weights
7920     set #6: pointer begin
7930
7940     let inh=0
7950     call Next_H
7960
7970     do while more #6
7980         !
7990         if hhin1(inh)=0 then
8000             let ipmax,vmax=0
8010             let IG$=IG$[6:135]
8020             for ip=1 to PERSONS(inh)
8030                 let IG$=IG$[6:135]
8040                 let pvvec(ip)=unpackb(IG$,start,len)
8050                 if pvvec(ip)<=topval then
8060                     if pprop(sumvec(pvvec(ip)))>vmax then
8070                         let vmax=pprop(sumvec(pvvec(ip)))
8080                         let ipmax=ip
8090                     end if
8100                 end if
8110             next ip
```

A-11

```
8120            if ipmax>0 then let HOUSWGT(inh)=sumvec(pvvec(ipmax))*HOUSWGT(inh)
8130          end if
8140
8150          call Next_H
8160      loop
8170 end sub
8180
8190 def pprop(arg)
8200      if arg=0 then
8210          let pprop=100
8220      else if arg<1 then
8230          let pprop=1/arg
8240      else
8250          let pprop=arg
8260      end if
8270 end def
8280
8290 sub Ratio_TVar( HMAT (,), #9, tname$)
8300      set #9: pointer begin
8310      print #7: time$
8320      let topval=ubound(HMAT,2)
8330      mat redim sumvec(lbound(HMAT,2):topval)
8340      mat sumvec = 0
8350
8360 !    mat read #9: vwk
8370
8380      for inh=1 to hh_count
8390          !
8400          read #9: vwk(inh)
8410          if hhin1(inh)=0 then let sumvec(vwk(inh))=sumvec(vwk(inh)) + HOUSWGT(inh)
8420      next inh
8430
8440      let maxadj=0
8450      let minadj=1
8460      ! Check that HH counts agree.....
8470      let chek_sum1,chek_sum2=0
8480      for i=lbound(sumvec) to topval
8490          let chek_sum1=chek_sum1+HMAT(1,i)+HMAT(2,i)
8500          let chek_sum2=chek_sum2+sumvec(i)
8510      next i
8520      print #7: "Checking tgt & tab sums for",tname$,chek_sum1,chek_sum2
8530
8540      ! Calculate Adjustment Ratio For Each Cell FOR FIRST AREA
8550      for i=lbound(sumvec) to topval
8560          if sumvec(i)>0 then
8570              let sumvec(i)=HMAT(1,i)/sumvec(i)
8580              if sumvec(i)>maxadj then let maxadj=sumvec(i)
8590              if sumvec(i)<minadj then let minadj=sumvec(i)
8600          end if
8610          print #7: using$("##.###",sumvec(i)),
8620      next i
8630      print #7:
8640      print #7: "Min, Max adjustments=",minadj,maxadj,
8650 !    line input prompt "-- Continue Y or N?": cont$
8660 !    if cont$="N" then stop
8670
8680      ! Adjust Sample Weights
8690      set #9: pointer begin
8700
8710      for inh=1 to hh_count
8720          !
8730          if hhin1(inh)=0 then let HOUSWGT(inh) = sumvec(vwk(inh)) * HOUSWGT(inh)
8740      next inh
8750
8760      print #7: time$
8770 end sub
8780
8790 ! Returns standardized absolute error for 5 % PUMS per p.3-5 of tech doc.
8800 def SEF(est,actual,pop)
8810      if pop=0 or abs(pop-actual)<.0001 then
8820          let SEF=0
8830      else
```

A-12

```
8840        let temp=(19*actual*(1-(actual/pop)))^.5
8850        let SEF=abs(est-actual)/temp
8860     end if
8870 end def
8880
8890 !!! Adjust Target Matrices for Pre|Over-Assignments    02-03-95
8900 sub ATM(flag)
8910     if flag=1 then
8920        call Adjust_TMat(h_1,9,8,"")
8930        call Adjust_TMat(h_2,17,4,"")
8940        call Adjust_TMat(h_4,21,4,"")
8950        call Adjust_TMat(h_3,25,8,"")
8960        call Adjust_TMat(h_5,33,4,"")
8970        call Adjust_TMat(h_6,37,4,"")
8980        call Adjust_TMat(p_1,41,16,"")
8990        call Adjust_TMat(p_2,57,8,"")
9000        call Adjust_TMat(p_7,77,4,"")
9010     end if
9020
9030     let IG$=IG$[6:135]
9040     for ip=1 to PERSONS(inh)
9050
9060        let IG$=IG$[6:135]
9070        if flag=1 then
9080           call Adjust_TMat(p_3,1,8,"P")
9090           call Adjust_TMat(p_4,9,8,"P")
9100           if unpackb(IG$,17,8)<18 then call Adjust_TMat(p_5,17,8,"P")
9110        end if
9120
9130     next ip
9140
9150     call Next_H
9160 end sub
9170
9180 end
```

What is claimed is:

1. A method for use in a data processing system for constructing a resultant database from a first database and a second database wherein data to appear in the resultant database is present in modified form in the first and second databases containing data records, the data processing system including a memory for storing the first, second and resulting databases, a processor for performing operations upon data records of the first, second and resulting databases and a plurality of procedures for controlling the operations of the processor, the method comprising the steps of:

selecting from the first database at least one construction property to be used in constructing the resultant database wherein a construction property is a type of information represented in partly or wholly implicit form by values stored in the data records of the first database and in explicit form in the values stored second database and wherein there is partial congruence of the at least one construction property between the first, second and resultant databases, selecting from the first and second databases at least two modeling properties wherein a modeling property is a type of information represented by values stored in the data records of the first and second databases and wherein there is partial congruence of the at least two modeling properties between the first, second and resultant databases, by operation of the processor operating under control of an inclusion probability procedure, assigning an inclusion probability to each of the data records of the first database containing the selected construction and modeling properties, by operation of the processor operating under control of a modeling procedure, constructing the modeling properties of the data records of second database containing the selected modeling properties, modeling the modeling properties of the data records of the first database containing the selected modeling properties against the constructed modeling properties of the data records of the second database containing the selected modeling properties, and comparing the modeled modeling properties of the data records of the first database and the constructed modeling properties of the second database, and by operation of the processor operating under control of the inclusion probability procedure, adjusting the inclusion probability of each one of the data records of the first database containing the selected modeling properties in accordance with the comparison of the modeled modeling properties of the data records of the first database and the constructed modeling properties of the second database until an acceptable match is achieved between all the modeled modeling properties of the data records of the first and the constructed modeling properties of the second database, and by operation of the processor operating under control of a resultant data record construction procedure, constructing data records of the resultant database from the finally selected data records of the first database using a probabilistic assignment operation in accordance with the final inclusion probabilities assigned to the plurality of data records of the first database to select the data records of the first database to be used in construction of the resultant database.

2. A data base construction system for constructing a resultant database from a first database and a second database, each containing data records, wherein data to appear in the resultant database is present in modified form in the first and second databases, the data base construction system comprising:

a memory for storing the first, second and resulting databases, a construction property selection processor for reading from the data records of the first database at least one construction property to be used in constructing the resultant database wherein a construction property is a type of information represented in partially or in wholly implicit form by values stored in the data records of the first database and in explicit form by values stored in data records of the second database and wherein there is partial congruence of the at least one construction property between the first, second and resultant databases, a modeling property selection processor for reading from the data records of the first and second databases at least two modeling properties wherein a modeling property is a type of information represented by values stored in the data records of the first and second databases and wherein there is partial congruence of the at least two modeling properties between the first, second and resultant databases, an inclusion probability processor for assigning an inclusion probability to each one of the data records of the first database containing the selected construction and modeling properties, a modeling processor for constructing the modeling properties of the data records of the second database containing the selected modeling properties modeling the modeling properties of the data records of the first database containing the modeling properties against the constructed modeling properties of the data records of the second database containing the modeling properties, comparing the modeled modeling properties of the data records of the first and the constructed modeling properties of the second database, and adjusting the inclusion probability of each one of the data records of the first database containing the modeling properties in accordance with the comparison of the modeled modeling properties of the data records of the first database and the constructed modeling properties of the second database until an acceptable match is achieved between all the modeled modeling properties of the data records of the first database and the constructed modeling properties of the second database, and a resultant data record construction processor for constructing data records of the resultant database from the finally selected data records of the first database using a probabilistic assignment operation in accordance with the final inclusion probabilities assigned to the data records of the first database to select the data records of the first database to be used in construction of the resultant database.

* * * * *